(12) United States Patent
MeLampy et al.

(10) Patent No.: US 6,311,186 B1
(45) Date of Patent: Oct. 30, 2001

(54) TELECOMMUNICATIONS SWITCHING SYSTEM UTILIZING A CHANNELIZED DATABASE ACCESS MECHANISM

(75) Inventors: Patrick J. MeLampy, Pepperell; Robert F. Penfield, Maynard; Theresa H. Ryan, Berlin; Duncan S. Fisher, Needham, all of MA (US)

(73) Assignee: Priority Call Management, Inc., Wilmington, MA (US)

( * ) Notice: Subject to any disclaimer, the term of this patent is extended or adjusted under 35 U.S.C. 154(b) by 0 days.

(21) Appl. No.: 09/122,148

(22) Filed: Jul. 24, 1998

Related U.S. Application Data

(60) Provisional application No. 60/075,384, filed on Feb. 20, 1998.

(51) Int. Cl.[7] .................................................. G06F 17/30
(52) U.S. Cl. ................... 707/10; 707/5; 707/100; 707/200; 709/217; 709/220; 709/223; 710/8; 379/201; 379/211
(58) Field of Search .................................... 709/203, 228, 709/223, 217, 220; 379/714, 201, 210, 211; 455/445, 417, 422, 461; 707/5, 10, 100, 200; 710/8

(56) References Cited

U.S. PATENT DOCUMENTS

| | | | |
|---|---|---|---|
| 4,439,636 | 3/1984 | Newkirk et al. | 379/123 |
| 4,518,824 | 5/1985 | Mondardini | 379/144 |
| 4,706,275 | 11/1987 | Kamil | 379/144 |
| 4,860,346 | 8/1989 | Mellon | 379/155 |
| 4,897,870 | 1/1990 | Golden | 379/144 |
| 4,975,942 | 12/1990 | Zebryk | 379/144 |
| 5,155,342 | 10/1992 | Urano | 235/380 |
| 5,163,086 | 11/1992 | Ahearn et al. | 379/91.02 |

(List continued on next page.)

FOREIGN PATENT DOCUMENTS 0 498 594 A2 * 8/1992 (EP) ...................................... 379/200

OTHER PUBLICATIONS

Gillett, Richard et al., "Using The Memory Channel Network", IEEE Micro, Jan.–Feb. 1997, Vol.: 17, Issue: 1, pp. 19–25.*

Venugopal, V. , "Integrated tool support in object–based environments", Proceedings of the First International Conference on Systems Integration, 1990, Apr. 23–26, 1990, pp. 171–176.*

Chopra, Manvinder, "Exploring Intelligent Peripheral Configurations," Third Annual International Conference on Universal Personal Communications, 1994 Record., Sep. 27–Oct. 1994, pp. 635–639.*

Lias, Joseph, Jr., "Advanced services managemnet via intelligent access peripheals," Intelligent Network Workshop, IN '96 IEEE, Apr. 21–24, 1996.*

Primary Examiner—Hosain T. Alam
Assistant Examiner—Shahid Alam
(74) Attorney, Agent, or Firm—Thomas, Kayden, Horstemeyer & Risley, L.L.P.

(57) ABSTRACT

A telecommunications database system is provided which permits an intelligent peripheral(IP) platform to have channelized database access to a plurality of databases. The IP platform can locate data in any one of the plurality of databases through a channel map that is derived from configuration data supplied by a default database and data supplied by an incoming call or request to the IP platform. Once the channel map is derived, the IP platform can select a channel to access a local or remote database based on the data supplied by the incoming call or request. This data may be a request for information, service circuit id, DNIS of the incoming call, address entered by a caller, OCN/Redirect of the call, ANI of the call, and/or progress indicators.

40 Claims, 39 Drawing Sheets

U.S. PATENT DOCUMENTS

| | | | |
|---|---|---|---|
| 5,226,073 | 7/1993 | Albal et al. | 379/91.02 |
| 5,359,642 | 10/1994 | Castro | 379/121 |
| 5,408,519 | 4/1995 | Pierce et al. | 379/88.17 |
| 5,577,109 | 11/1996 | Stimson et al. | 379/112 |
| 5,583,920 * | 12/1996 | Wheeler, Jr. | 379/88 |
| 5,621,787 | 4/1997 | McKoy et al. | 379/144 |
| 5,664,170 * | 9/1997 | Taylor | 709/220 |
| 5,696,906 | 12/1997 | Peters et al. | 705/34 |
| 5,721,768 | 2/1998 | Stimson et al. | 379/114 |
| 5,742,905 * | 4/1998 | Pepe et al. | 455/461 |
| 5,749,075 | 5/1998 | Toader et al. | 705/14 |
| 5,867,495 * | 2/1999 | Elliott et al. | 370/352 |
| 5,875,242 * | 2/1999 | Glaser et al. | 379/207 |
| 5,915,008 * | 6/1999 | Dulman | 379/201 |
| 5,930,474 * | 7/1999 | Dunworth et al. | 709/217 |
| 6,055,227 * | 4/2000 | Lennert et al. | 370/254 |
| 6,094,659 * | 7/2000 | Bhatia | 707/104 |
| 6,108,669 * | 8/2000 | Dalenberg et al. | 707/203 |
| 6,112,085 * | 8/2000 | Garner et al. | 455/428 |
| 6,223,219 * | 4/2001 | Uniacke et al. | 709/223 |

\* cited by examiner

```
#ifndef __PCM_IE_HEADER__
define __PCM_IE_HEADER__ include <stdlib.h>
include <pcm/telnum.h>
#include <pcm/types.h>
#include <pcm/cos.h>

/*****************************
 * Information Element Data Types   *
 *****************************/
typedef enum {
    IE_DT_UNKNOWN,
    IE_DT_TEXT,
    IE_DT_TELNUM,
    IE_DT_TELDIAL,
    IE_DT_LONG,
    IE_DT_SHORT,
    IE_DT_ENUM,
    IE_DT_NAMENUM,
    IE_DT_BYTE,
    IE_DT_DBREF,
    IE_DT_DECIMAL,
} DataType;
/*****************************
 * Record Types               *
 *****************************/
typedef enum {
    IE_RT_UNKNOWN,
    IE_RT_USER,
    IE_RT_CUSTOMER,
    IE_RT_CLASSOFSER,
    IE_RT_TRUNKGRP,
    IE_RT_RATEPLAN,
    IE_RT_RATEENTRY
} RecordType;

/*****************************
 * Base Class - Information Element  *
 *****************************/
class InformationElement
{
  public:
        byte    type;
        long    fieldIndex;
        short   length;

InformationElement(DataType, boolean, short, long);
        InformationElement(DataType, short, long);
        InformationElement(const InformationElement &);
        InformationElement();
        InformationElement& operator=(const InformationElement &);
```

FIG. 16A

```
friend int operator=(const InformationElement &x,
                    const InformationElement &y)
  { return x.type = y.type && x.length = y.length &&
           x.fieldIndex = y.fieldIndex; }
friend int operator!=(const InformationElement &x,
                      const InformationElement &y)
  { return x.type != y.type && x.length != y.length &&
           x.fieldIndex!= y.fieldIndex; } void Set(DataType, boolean, short, long);
void SetTypeAndIField(DataType, boolean);
void SetLength(short);
void SetFieldIndex(long);

void Get(DataType *, boolean *, short *, long *);
void GetType(DataType *);
void GetLength(short *);
void GetFieldIndex(long *);
DataType GetType();
short GetLength();
long GetFieldIndex();
boolean IndexedField();
};
/******************************
 *                            *
 * String Class               *
 *                            *
 ******************************/
class TextString : public InformationElement
{
  public:
        short  len;
        char   string[MAXSTRLEN];

TextString(const char *, boolean);
        TextString(const char *, boolean, long);
        TextString(const char *, int, boolean);
        TextString(const char *, int, long, boolean);
        TextString(char*; long, boolean);
        TextString(int, boolean);
        TextString();
        TextString(const TextString &);
        TextString(const TextString &, int);
        TextString& operator=(const char *);
        TextString& operator=(const TextString &);
        char& operator[] (int);
        const char& operator[](int) const;

void SetString(char *);
        void SetMaxLength(short);
        short GetMaxLength();
        void Display();
        void Extract(char *);

friend int operator=(const TextString &x, const char *s)
```

FIG. 16B

```
              { return stremp(x.string, s) = 0; } friend int operator=(const TextString &x, const TextString &y)
              { return stremp(x.string, y.string) = 0; } friend int operator! =(const TextString &x, const char *s)
              { return stremp(x.string, s) 1= 0; }.

friend int operator!=(const TextString &x, const TextString &y)
              { return stremp(x.string, y.string) != 0; }
};
/************************************
 *                                  *
 * Telnum class
 ***********************************/
class Telnum : public InformationElement
{
  public:
          country_code_str_t countryCode;
          area_code_str_t    areaCode;
          phnnum_str_t       phoneNumber;
          exten_str_t        extension;

Telnum(const char *, const char *, const char *, const char *);
          Telnum(char *, boolean);
          Telnum(const Telnum &, boolean);
          Telnum(const Telnum_t, boolean);
          Telnum(struct Telnum_t, long, boolean);
          Telnum();
          Telnum& operator=(const char *);
          Telnum& operator=(const Telnum &);
          Telnum& operator=(const Telnum_t);

boolean Encode(char *);

void Set(Telnum_t);
          void SefeInum(Telnum_t);
          void Display();
          void Extract(Telnum_t *);
          void parse(char *, boolean);

void clear()
                  { bzero(countryCode, COUNTRY_CODE_STR_SIZE);
                    bzero(areaCode,AREA_CODE_STR_SIZE);
                    bzero(phoneNumber, PHONE_STR_SIZE);
                    bzero(extension, EXTEN_STR_SIZE); }
          friend int operator=(const Telnum &x, const Telnum &y)
                  { return (stremp(x.countryCode, y.countryCode)== 0 &&
                            stremp(x.areaCode, y.areaCode)== 0 &&
                            stremp(x.phoneNumber, y.phoneNumber) = 0 &&
                            stremp(x.extension, y.extension)== 0); }
          friend int operator!=(const Telnum &x, const Telnum &y)
                  { return (stremp(x.countryCode, y.countryCode) != 0 ||
```

FIG. 16C

```
                    stremp(x.areaCode, y.areaCode) != 0 ||
                    stremp(x.phoneNumber, y.phoneNumber) != 0 ||
                    stremp(x.extension, x.extension) != 0); }
};
/***********************************
 *  Telnum dial class               *
 ***********************************/
class TelnumDial : public InformationElement
{
  public:
        country_code_str_t    countryCode;
        area_code_str_t       areaCode;
        phnnum_str_t          phoneNumber,
        exten_str_t           extension;
        long                  flag;

TelnumDial(const char *, const char *, const char *, const char *,
                   const long);
        TelnumDial(const TelnumDial &);
        TelnumDial(const Telnum_dial_t);
        TelnumDial(struct Telnum_dial_t, long);
        TelnumDial();
        TelnumDial& operator=(const char *);
        TelnumDial& operator=(const TelnumDial &);
        TelnumDial& operator=(const Telnum_dial_t);

void Display();
        void SetFlag(long);
        void Extract(Telnum_dial_t *);

friend int operator!=(const TelnumDial &x, const TelnumDial &y)
                { return (stremp(x.countryCode, y.countryCode) != 0 ||
                          stremp(x.areaCode, y.areaCode) != 0 ||
                          stremp(x.phoneNumber, y.phoneNumber) != 0 ||
                          stremp(x.extension, x.extension) != 0); }
};
/***********************************
 *  Long class                      *
 ***********************************/
class Long : public InformationElement
{
  public:
        long    value;

Long(long, boolean);
        Long(long, long, boolean);
        Long(Long &, boolean);
        Long();

Long& operator=(const long);
        Long& operator=(const Long&);
```

FIG. 16D

```
            void Display();
            void SetValue(long);
            void Extract(long *);

friend int operator=(const Long &x, const long y)
                    { return x.value = y; } friend int operator=(const Long &x, const Long &y)
                    { return x.value =y.value; } friend int operator!=(const Long &x, const long y)
                    { return x.value != y; } friend int operator!=(const Long &x, const Long &y)
                    { return x.value != y.value; }
};

/********************************
 * Short class                  *
 ********************************/
class Short: public InformationElement
{
public:
            short    value;

Short(short);.
            Short(short, long);
            Short(Short &);
            Short();

Short& operator=(const short);
            Short& operator&(const Short&);

void Display();
            void SetValue(Short);
            void Extract(short *);

friend int operator=(const Short &x, const short y)
                    { return x.value - y; } friend int operator=(const Short &x, const Short &y)
                    { return x.value = y.value; } friend int operator! =(const Short &x, const short y)
                    { return x.value 1= y; } friend int operator!=(const Short &x, const Short &y)
                    { return x.value != y.value; }
};

/********************************
 * Decimal class                *
 ********************************/
class Decimal : public InformationElement
```

FIG. 16E

```
{
public:
        int        number;
        int        fraction;

Decimal(long);
        Decimal(long, long);
        Decimal(Decimal &);
        Decimal();

Decimal& operator=(const long);
        Decimal& operator=(const Decimal&);

void Parse(long);
        long MakeLong();

void Display;
        void Extract(long *);
        void SetNumber(long);
        void UpdateAmount(long);
        void AdjustAmount(long);

friend int operator-=(const Decimal &x, const Decimal &y)
                { return x.number = y.number && x.fraction = y.fraction; } friend int operator! =(const Decimal &x, const Decimal &y)
                { return x.number != y.number !! x.fraction!= y.fraction; }
};

class DbReference : public InformationElement
{
        long       crid;
        long       subClass;
        long       instance;

public:

DbReference(long);
        DbReference(long, long);
        DbReference(Decimal &);
        DbReference();

DbReference& operator=(const long);
        DbReference& operator=(const DbReference&);

void Display;
        void Extract(long *, long *, long *);
        void Set(long, RecordType, long, long);
        void SetCustAndType(long, RecordType);
        void SetSubClass(long);
        void SetInstance(long);

void GetCust(long *);
        long GetCust();
```

FIG. 16F

```
        void GetType(RecordType *);
        RecordType GetType();
        void GetSubClass(long *);
        long GetSubClass();
        void GetInstance(long *);
        long GetInstance();
};
/*******************************
 * Byte class                  *
 *******************************/
class Byte : public InformationElement
{
  public:
        byte data;

Byte(byte);
        Byte(Byte &);
        Byte();

Byte& operator=(const byte);
        Byte& operator=(const Byte&);

void Display();
        void SetData(byte);
        void Extract(byte *);

friend int operator-(const Byte &x, const byte y)
                { return x.data = y; } friend int operator-=(const Byte &x, const Byte &y)
                { return x.data = y.data; } friend int operator!=(const Byte &x, const byte y)
                { return x.data != y; } friend int operator!=(const Byte &x, const Byte &y)
                { return x.data !=y.data; }
};
/*******************************
 * Namenum class               *
 *******************************/
class Namenumie : public InformationElement
{
  public:
        union {
                char name[4];
                long number;
        } element;

Namenumie(char *);
        Namenumie(long);
```

FIG. 16G

```
    Namenumie(const Namenumie &);
    Namenumie(const namenum_t);
    Namenumie(namenum_t, long);
    Namenumie();

Namenumie& operator=(const long);
    Namenumie& operator=(const char *);
    Namenumie& operator=(const namenum_t);

void Display();
    void SetElement(namenum_t);
    void Extract(namenum_t *);

friend int operator=(const Namenumic &x, const char *y)
            { return stremp(x.element.name, y) = 0; }
    friend int operator=(const Namenumie &x, const long y)
            {return x.element.number = y; }
    friend int operator=(const Namenumie &x, const Namenumie &y)
            { return x.element.number = y.element.number &&
        stremp(x.element.name, y.element.name) = 0; }
    friend int operator!=(const Namenumie &x, const char *y)
            { return stremp(x.element.name, y) != 0; }
    friend int operator!=(const Namenumie &x, const long y)
            { return x.element.number != y; )
    friend int operator!=(const Namenumie &x, const Namenumie &y)
            { return x.element.number != y.element.number &&
        stremp(x.element.name, y.element.name) != 0; }
};
```

FIG. 16H endif

```
#ifndef _PCM_DBREC_HEADER_
define _PCM_DBREC_HEADER_ include <pem/ie.h> define MAX_RECORD_LEN      992
define DB_LOOKUPKEY_SIZE   MAXSTRLEN typedef enum {
  DB_DATAD,
  DB_LOOKUPD_STRING
} DbType;

typedef enum {
  DB_TRANS_UNKNOWN,
  DB_TRANS_CREATE,
  DB_TRANS_UPDATE,
  DB_TRANS_DELETE,
  DB_TRANS_READ,
  DB_TRANS_FIND,
  DB_TRANS_ADJUST
} DhTransType;

typedef enum {
  DB_LKDB_EXACT,
  DB_LKDB_PARTIAL
} DbSearchType;

typedef struct {
  int   num;
  long  field;
  long  instance;
  void  *data;
} DbSCHEMA;

class DbRecord {
  public:
        long    crid;
        long    subClass;
        long    instance;

DbRecord(long, long, long);
        DbRecord(long, RecordType, long, long);
        DbRecord();

void SetCustAndType(long, RecordType);
        void SetSubClass(long);
        void SetInstance(long);
        void Set(long, RecordType, long, long);

void GetCustomer(long *);
        long GetCustomer();
        void GetRecType(RecordType *);
        RecordType GetRecType();
```

FIG. 17A

```
        void StoreKey();
        void LoadKey();

char* GetData(int);
        void GetData(char *);
};

class DbTransaction : public DbDataRecord
{
    DbTransType type;

public:

DbTransaction(DbTransType, DbDataRecord);
    DbTransaction(DbTransType, namenum_t);
    DbTransaction(DbTransType, long, RecordType, long, long, namenum_t);
    DbTransaction(long, RecordType, long, long, char *);
    DbTransaction();

void SetTransType(DbTransType);

void GetTransType(DbTransType *);
    DbTransType GetTransType();

// Server side methods
    void Create(message_t *, message_t *, int, int, int, int);
    void Update(message_t *, message_t *, int, int, int, int);
    void Adjust();
    void Read(message_t*, message_t *, int, int);
    void Delete(message_t *, message_t *, int, int, int, int);
    void Find(message_t *, message_t *, int);

// Client side methods
    rtc_t CreateRecord();
    rtc_t UpdateRecord();
    rtc_t AdjustRecord();
    rtc_t ReadRecord(DbTransaction *);
    rtc_t DeleteRecord();
    int FindRecord(DbSearchType, DbRecord *, int, long *);
};

typedef struct l1SearchRec {
    LLIST_STUFF(l1SearchRec);
    DbRecord   record;
    } SearchRecord;

class DbSearchRec : public DbRecord
{
    long keyType;
    char key[DB_LOOKUPKEY_SIZE];
```

FIG. 17B

```
public:
    DbSearchRec(long, RecordType, long, long, char *, long);
    DbSearchRec(long, long, long, char *, long);
    DbSearchRec(DbRecord, long, char *);
    DbSearchRec(DbRecord);
    DbSearchRec();

void Set(long, RecordType, long, long, char*, long);
    void SetKeyType(long);
    void SetKey(char*);

void GetKeyType(long *);
    long GetKeyType();
    void GetKey(char *);

int Find(DbSearchType, DbRecord *, int, long*, int);
    int FindAllMatches(DbSearchType, message_t*, int, int, long*);
    int UniqueEntry(boolean, int, DbSearchRec*, int);
    int AddToList(SearchRecord*);
    rtc_t Create(message_t*, message_t*, int);
    void Update();
    void Read();
    void Delete();

void StoreKey();
    void LoadKey();
};
#endif
```

| STATE | DESCRIPTION |
|---|---|
| XCP_UNKNOWN | UNKNOWN STATE (USUALLY INDICATES AN ERROR) |
| XCP_DOWN | CONNECTION DOWN BUT ON PURPOSE |
| XCP_DORMANT | CONNECTION DOWN BUT SHOULD BE UP |
| XCP_WAITING | DCM IS WAITING FOR HELO FROM PROXY |
| XCP_LISTENING | PROXY IS WAITING FOR TCP CONNECTION |
| XCP_BINDING | BIND SENT AND WAITING FOR BIND_RSP |
| XCP_READY | CONNECTION UP, DTR'S CAN BE TRANSMITTED |

| TYPE | HEX VALUE |
|---|---|
| XCP_HELO | 0x0000 |
| XCP_BIND | 0x0001 |
| XCP_BIND_RSP | 0x8001 |
| XCP_RQST | 0x0002 |
| XCP_RQST_RSP | 0x8002 |
| XCP_PING | 0x0004 |
| XCP_PING_RSP | 0x8004 |

| STATUS | DESCRIPTION |
|---|---|
| DBT_UNKNOWN | UNKNOWN STATUS (USUALLY INDICATES AN ERROR |
| DBT_FAIL | REQUEST FAILED FOR UNSPECIFIED REASONS |
| DBT_SUCCESS | REQUEST SUCCEEDED |
| DBT_REC_EXISTS | FIELDS SEARCHED FOR FOUND |
| DBT_REC_NOEXISTS | FIELDS SEARCHED FOR WERE NOT FOUND |

FIG. 22

| DCMSTATS MEMBER | DESCRIPTION |
|---|---|
| CMS_CONATMP | #TIMES CONNECT_FUNC CALLED (ATTEMPTS) |
| DCMS_CONFAIL | #TIMES MAXED OUT CALLS TO CONNECT OR PING |
| DCMS_CONNECT | #CONNECTIONS ESTABLISHED SUCCESSFULLY |
| DCMS_CONCLSE | #CONNECTIONS IN READY STATE CLOSED |
| DCMS_CONDROP | #CONNECTIONS IN NON-READY STATE CLOSED |
| DCMS_CONCLNT | #TIMES CLIENTS PARAMETER ALTERED |
| DCMS_RCVBAD | #PACKETS RECEIVED W/ INVALID FIELDS OR LENGTH |
| DCMS_RCVUNKN | #PACKETS RECEIVED W/ INVALID FIELDS OF LENGTH |
| DCMS_RCVOOS | #PACKETS RECEIVED "OUT-OF-STATE" |
| DCMS_RCVHELO | #HELOS RECEIVED IN WAITING STATE |
| DCMS_RCVBIND | #BIND_RSPS RECEIVED IN BINDING STATE |
| DCMS_RCVPING | #PING_RSPS RECEIVED IN READY STATE |
| DCMS_RCVRQST | #RQST_RSPS RECEIVED IN READY STATE |
| DCMS_RCVSEQN | #RQST_RSPS RECEIVED W/ UNMATCHED SEQN |
| DCMS_RCVPKT | #PACKETS RECEIVED TOTAL |
| DCMS_SNDOOS | #ATTEMPTS TO SEND "OUT-OF-STATE" PACKET |
| DCMS_SNDRXT | #ATTEMPTS TO RETRANSMIT A PACKET |
| DCMS_SNDCTRL | #CONTROL (BIND & PING) PACKETS SENT (DATA = 0) |
| DCMS_SNDDATA | #DATA (RQST) PACKETS SENT (DATA > 0) |
| DCMS_SNDPKT | #PACKETS SENT TOTAL (CONTROL + DATA) |
| DCMS_DBTRCVD | #TRANSACTIONS RECEIVED BY DCM |
| DCMS_DBTFAIL | #TRANSACTIONS THAT FAILED (REASONS UNKNOWN) |
| DCMS_DBTDROP | #TRANSACTIONS THAT WERE DROPPED FROM OVERLOAD |
| DCMS_DBTTMO | #TRANSACTIONS THAT TIMED OUT |
| DCMS_DBTQUED | #TRANSACTIONS THAT WERE ADDED TO PENDING QUEUE |
| DCMS_DBTCLNT | #TRANSACTIONS PASSED ON TO CLIENT SUCCESSFULLY |
| DCMS_ERRSLIB | #ERRORS RETURNED BY SERIAL_FUNCTIONS |

TELECOMMUNICATIONS SWITCHING SYSTEM UTILIZING A CHANNELIZED DATABASE ACCESS MECHANISM

CROSS-REFERENCE TO RELATED APPLICATIONS

This application depends for priority upon U.S. Provisional Patent Application Ser. No. 60/075,384, filed on, Feb. 20, 1998 and entitled TELECOMMUNICATIONS SWITCHING SYSTEM UTILIZING A CHANNELIZED DATABASE ACCESS MECHANISM.

FIELD OF THE INVENTION

The present invention relates to a database system. More particularly, the present invention relates to a telecommunications database system which permits an intelligent peripheral to have channelized database access to a plurality of databases.

BACKGROUND OF THE INVENTION

Data requirements in the telecommunications field are changing. Telecommunication switches and intelligent peripherals today require real-time access to large amounts of data. This data includes, but is not limited to, subscriber profiles, configuration data, voice recordings, and speech recognition templates. Today's Intelligent Peripheral (IP) contains an ever increasing array of data objects. Access to these objects must be real-time, distributed, and scalable. However one drawback encountered is that the conventional database storage mechanisms deployed tend to limit the size and complexity of IP's.

Another drawback encountered is that the conventional approach of replicating subscriber data is no longer feasible. Databases are commonly accessed through Service Control Points (SCP's). These SCP's typically provide access to off-the-shelf Structured Query Language (SQL) database products such as Oracle, Sybase, or Informix. The SCP computer platforms are usually mid- to high-end fault-tolerant or fault resilient computers. Often, the contents of the SCP databases are replicated to provide the required throughput. For example, this is the case with the portable 800-number databases. An 800-number database is located on the network by utilizing known in advance addresses, either physical, or logical. These addresses can be managed and changed through Signaling Connection and Control Part (SCCP) management functions, or through similar highly available network architectures. Each database contains the entire universe of available data, and can meet the needs of an IP. However, the replication of databases is logistically difficult. As a result, the latency for 800-number changes is measured in weeks.

Furthermore, personalized data such as subscriber profiles, voice recognition templates, and such are not easily replicated to a number of dispersed SCP locations. Additionally, data which is changed often (such as voice messages) are not candidates for replication due to latency issues.

A further drawback encountered is that the hardware for IP is not acceptable for use in databases. Computer systems which are tuned to the real-time database requirements of these off-the-shelf database products are often not appropriate for inclusion in IPs and switching devices. For example, an ATT 5ESS Class 5 end office switch is not by nature a good candidate for inclusion of Oracle 7.2 Parallel Server. Voice processing components are not generally compatible with the high-end database computer hardware. Open Computer Telephone Integration components like the Dialogic D24SC-T1 require an ISA bus computer, and are incapable of running in the multi-processor mode required by most high-end databases. Due to the above-reasons, the Intelligent Network (IN) architecture clearly shows the SCP as a separate distinct component.

A still further drawback encountered is the use of global rather than distributed databases. IP Platforms are usually distributed throughout a network. This allows the voice processing ports to be directly connected to the location requiring enhanced services. For most telephone networks, including cellular networks, the IP Platforms are scattered throughout the coverage area. The cost of long-hauling the telephone circuits to central locations is less economical than replicating the IP platforms. When subscriber-based data services are not centralized, all IP services would have to be processed out of the IP that contains the subscriber data. The general model for the wired network infrastructure is to have a global database for each IN that is fragmented by category of access. The recommendation is a series of separate SCP's-one for each category. Some categories include:

1. Call Management Services Database (CMSDB)
2. Line Information Database (LIDB)
3. Business Information Database (BSDB)
4. Home Location Register (HLR)
5. Visitor Location Register (VLR)

Another drawback encountered is that current IP databases are centralized. The IN model is to centralize subscriber data for a region into a singular CMSDB. In the wireless network model, an HLR is defined to retain information about subscribers, and is in effect a distributed database. The cellular roaming network providers distribute a table which maps ranges of Mobile Identification Numbers (MIN) to particular HLR databases. If the volume of transactions exceeds the capacity of the HLR's database, the service provider has few options. One is splitting the database into two pieces, but this is operationally complex and will result in service outages.

More particularly, IP vendors typically connect their service circuit computers onto a network which serves the data from a remote computer running the SQL database. The conventional approach is to build a single large database which must by necessity grow to the required size. By adding additional processors, fragmenting the database into distinct pieces which remain logically one database, and performing careful database management, the database can grow to meet the requirements of the IP service circuits. Ultimately, the database grows to a size which is difficult to manage, or even impossible to expand. At this point, the IP service circuits can no longer expand to handle additional traffic.

Thus, a single population of users grows to a point where the database prevents expansion of service. It is difficult and nearly impossible to split the database into two manageable pieces since the inbound telephone traffic is not segmented in any way. If the database can be split, the action will disrupt service for a substantial period of time.

To make matters worse, the new applications being developed and marketed require significantly larger amounts of data than previously required. For example, the throw away calling card results in databases with hundreds of millions of records. Because calling card service circuits have no control over where a call is originated, the database must be ubiquitous, being available for all service circuits. Further complicating matters is that the throw away calling cards are often left with a small negligible balance which must be maintained until the card expires. This time period is often one or more years.

Another problem with the conventional telecommunications IP infrastructure is the inability to utilize data across different platforms. Cellular companies typically have a Voice Activated Dialing platform entirely separate and distinct from the MTSO (Mobile Telephone Switch), which, in turn, is distinct from a voice mail system. Thus, each user may be provisioned in three separate databases. Some of these databases are network-wide accessible, and some are not. Voice mail and voice activated dialing, therefore, may only be available in certain regions based on data availability.

Another problem with the conventional telecommunications IP infrastructure is the lack of Standard Network Interfaces. All current SQL databases require vendor specific drivers and interfaces which are designed for the client computer. Thus, software from Oracle must run on the IP computer node to fully take advantage of the SQL database from Oracle. There are no industry standards for how a client can connect to and perform SQL transactions. Open Database Connectivity (ODBC) and CORBA provide Application Programming Interfaces (API's), but utilize drivers to implement vendor-specific transport mechanisms. For example, to run Oracle Client or Oracle ODBC, SQL*net is required on the client computer system.

ADVANTAGES OF THE INVENTION

It is an advantage of the present invention to provide a database system which overcomes the drawbacks of the prior art described above.

These and other advantages of the present invention will become apparent to one skilled in the art in view of the figures and description of the figures given below.

SUMMARY OF THE INVENTION

Unlike the voice mail industry, the calling card industry requires very large database configurations. These configurations are often many millions of records. Many customers have extensive customer service systems which typically require Structured Query Language (SQL) access, and may even provision a parallel calling card database due to missing fields and information. The design of the present invention is a migration from conventional database architecture to a new more scalable and open architecture. Using the design of the present invention customers will be able to write to a Proxy Server to access existing databases. The customer partition will be assigned a database channel. These channels will point to a physical database, which can be either a local or foreign database. The system will thus be able to support a large number of physical external databases. The design of the present invention also permits "expansion on the fly", without the need to restart the system. Additionally, the design of the present invention will allow database channels or fragments to be taken out of service for maintenance reasons individually or in groups.

The database system of the present invention requires several elements, which taken together, provide a system which addresses the drawbacks encountered by conventional systems, as discussed above. Any number of IP's in a network will be able to access any number of databases in a consistent and manageable fashion.

A single database (called the network default database) serves and manages cache coherency for a set of records which identify the complete network of databases, how to access the databases, and what records and defaults are to be used. Because the data records are utilized on every transaction, they are cached in memory on each participating IP. Once in memory, the present invention manages the cache coherency in a way which is appropriate to the task. Thus propagation of changes is permitted to have some latency.

IP platforms receive and process telephone calls. Calls arrive at the IP with information that is implicit and explicit. For example, the actual circuit utilized is implied, while the Automatic Number Identification (ANI) may be provided explicitly. Data that arrives with an inbound call includes those fields identified in American National Standards Institute (ANSI) or International Telecommunications Unions (ITU) Integrated Services Digital Network User Part (ISUP) standards, and includes, inter alia, Calling Party, Called Party, Redirecting Number, Redirect Number, Original Calling Party, Call Progress Indicators. A complete list of possible fields can be found in the International Telecommunications Union Documents Q.761–Q.767 for SS7 based networks, and Q.931 for Primary Rate based networks, which are incorporated herein by reference. The algorithms described here utilize the implicit and explicit data to determine how data should be accessed.

Each IP participating in the Channelized Database mechanism of the present invention must have the following:

1. a connection to a network (SS7, or TCP/IP);
2. access to one or more databases (SCP, SQL Servers, Proprietary Servers) through the network; and
3. access to a default database for maintaining configuration about the available database channels.

When data is required, the implicit and explicit data is utilized to determine which channel map is to be used for accessing data (as discussed in detail in the description of FIGS. 4A–4E). This map contains all of the information about every type of data record used by the IP. The map is accessed from the default database, and is cached in local memory. Notification of map changes is required to flush the old entry from the memory cache. This is a service required of the default database utilized to store the map.

The map contains a list of record types used by the IP. The record types each have a physical channel associated with them. The physical channels may be numbered. For example, the physical channels can be numbered from 1 to 99. In such a case, physical channel 1 is reserved as the default database. Small systems, or systems with no channel maps, will always utilize channel 1 for all data requirements. Also contained logically within the channel map configuration is a series of default fields to be supplied if missing in the server. The default fields are listed for every record type utilized on the IP. These fields are also contained within the default database.

To facilitate accurate and sustained identification of records and fields, the present invention implements an Open Systems Interconnection (OSI) compliant identification scheme. This scheme provides hierarchy for the originator of the record, the record itself, and any fields within the record.

Once the physical channel is determined, a second data record describing the physical channel is accessed. This record is also cached in local memory, and is accessed from the default database. The physical channel configuration contains all of the data required to access the database. Typically, this contains the address and location of the primary proxy server, secondary server, and other data as needed to configure the communication link. For instance, whether the network is SS7 or Transmission Control Protocol/Internal Protocol (TCP/IP), whether the session layer is Common Management Information Protocol (CMIP), Remote Operations Service Element (ROSE), Transactional Capabilities Application Protocol (TCAP), or Simple Network Management Protocol (SNMP). The location of the database may be expressed as a SS7 point code, TCP/IP address, or a logical name which is resolved to one of these. If resolution of logical name to physical address is required, Global Title Translation for SS7 networks is used, and a Domain Name System (DNS) Name Server is utilized in TCP/IP addresses. If redundant or multiple servers are managed by SCCP SS7 software, this fail-over mechanism is employed.

In operation, a transaction request message is sent to the IP server process. The transaction request may be a caller using a calling card, dialing an 800 number, checking voicemail, or some other telecommunication request. The IP server process receives the transaction and processes the transaction. Steps include journaling the transaction for replication to a standby IP server process, updating statistical counters and performance monitoring tables, etc. The transaction is converted to the session layer format, and transported via the defined network to the proxy server. The IP server then waits for a response. Note that in the general case, the IP servers are not single-threaded and can handle any number of outstanding database requests.

The proxy server receives the transaction request, and decodes the request into the format required by the resident database. Typically, this is decoded into fields, and then a user interface for raw access to the SQL database is used. For example, when Oracle is used, OCI programmers interface is used. The transaction is then performed against the database. The results of the transaction are then returned to the IP server process after being coded for transport and session layers. (NOTE: A proxy server may not be required if the database mechanism supports ROSE or TCAP transactions natively.)

The IP server receives the response, decodes the response into local formats, overlays the default fields for the particular record accessed, and then forwards the completed transaction to the requesting process within the IP platform.

Each and every transaction contains the key fields required for record identification, and then only the fields which are to be changed (or instantiated on a create transaction). The values of fields and how they replace or modify themselves will be defined on the basis of their data types. For instance, fields that are text strings will simple replace themselves entirely upon update. Fields that contain numeric values will be either incremental or absolute depending on the transaction parameters. For example, suppose a balance field was to be maintained. Each normal adjustment would be a signed value which is added to the current contents of the balance. Since every adjustment is performed solely at the database, no locking is required outside of the database. The IP's do not have to lock the record to subtract the cost of a call as it occurs, or to add to the subscribers balance upon a successful recharge.

This form of transaction management is simplified by breaking down each record utilized on an IP into its fields, and then further into their fundamental storage types. These types are easy to identify, and are also built into many of the Abstract Syntex Notation (ASN.1) encoders and decoders. By using object oriented software tools, the task of managing field-by-field transactions is simplified by the use of inheritance from these base fundamental storage types. The fundamental storage types have methods associated with them for conversion to and from the binary encoded forms Bit Error Rate (BER) utilized during transport. Other methods exist for performing various types of transactions on a field-by-field basis. The use of object oriented data classes greatly simplifies the handling of fields across multiple computer platforms.

The external databases are maintained externally using tools provided as part of the external database. The provisioning of these databases could be performed with SQL access mechanisms, or equivalent access mechanisms. A key concept is that the real-time IP data requirements are met through the proxy server, while the real-time administrative and provisioning access are met through either direct access to the database, or through channelized access provided by the present invention. Direct access to the database is desirable since the SQL databases by definition are better suited to administrative access and ad-hoc reporting.

Briefly stated, a telecommunications database is provided which permits an intelligent peripheral (IP) to have channelized database access to a plurality of databases. The IP can locate data in any one of the plurality of databases through a channel map that is derived from configuration data supplied by a default database and data supplied by an incoming call or request to the IP. Once the channel map is derived, the IP can select a channel to access a local or remote database based on the data supplied by the incoming call or request. This data may be a request for information, service circuit id, DNIS of the incoming call, address entered by a caller, OCN/Redirect of the call, ANI of the call, and/or progress indicators.

A feature of the present invention includes a database system having an intelligent peripheral device, a database connected to the intelligent peripheral device through a communications medium, a default database connected to the intelligent peripheral device through the communications medium, the default database containing configuration data about the database, and the intelligent peripheral device accessing data stored in the database by acquiring the configuration data from the default database and communicating with the database in accordance with the configuration data.

Another feature of the present invention includes a database system having an intelligent peripheral device, a plurality of databases connected to the intelligent peripheral device through a communications medium, a default database connected to the intelligent peripheral device through the communications medium, the default database containing configuration data about the plurality of databases, and the intelligent peripheral device accessing data stored in a of the plurality of databases by acquiring the configuration data from the default database and communicating with the plurality of databases in accordance with the configuration data.

A further feature of the present invention includes a channelized database system having an intelligent peripheral device, a plurality of communication channels connected to the intelligent peripheral device, each communication channel associated with a data base, and a memory element connected to the intelligent peripheral device for providing configuration data about the plurality of communication channels to the intelligent peripheral device such that the intelligent peripheral device can locate and access data stored in a data base associated with the plurality of communication channels.

A still further feature of the present invention includes a method for accessing a plurality of databases including the steps of receiving a request for data from a user, accessing a default database for configuration data for the plurality of databases, deriving a database map from the requested data, the configuration data, and user information, accessing a database of the plurality of databases for the requested data based on the database map, receiving the requested data from the database, and transmitting the requested data to the user.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings in which:

FIGS. 16A–16H show the information element class source code of the present invention.

FIGS. 17A–17C show the DB record class source code of the present invention.

FIG. 20 is a table illustrating the valid states understood by the XCP server of the present invention.

FIG. 21 is a table illustrating XCP packet types of the present invention.

FIG. 22 is a table illustrating XCP statuses of the present invention.

FIG. 24 is a table illustrating various XCP statistics maintained by the DCM of the present invention.

DETAILED DESCRIPTION OF THE DRAWINGS

Figure 1:
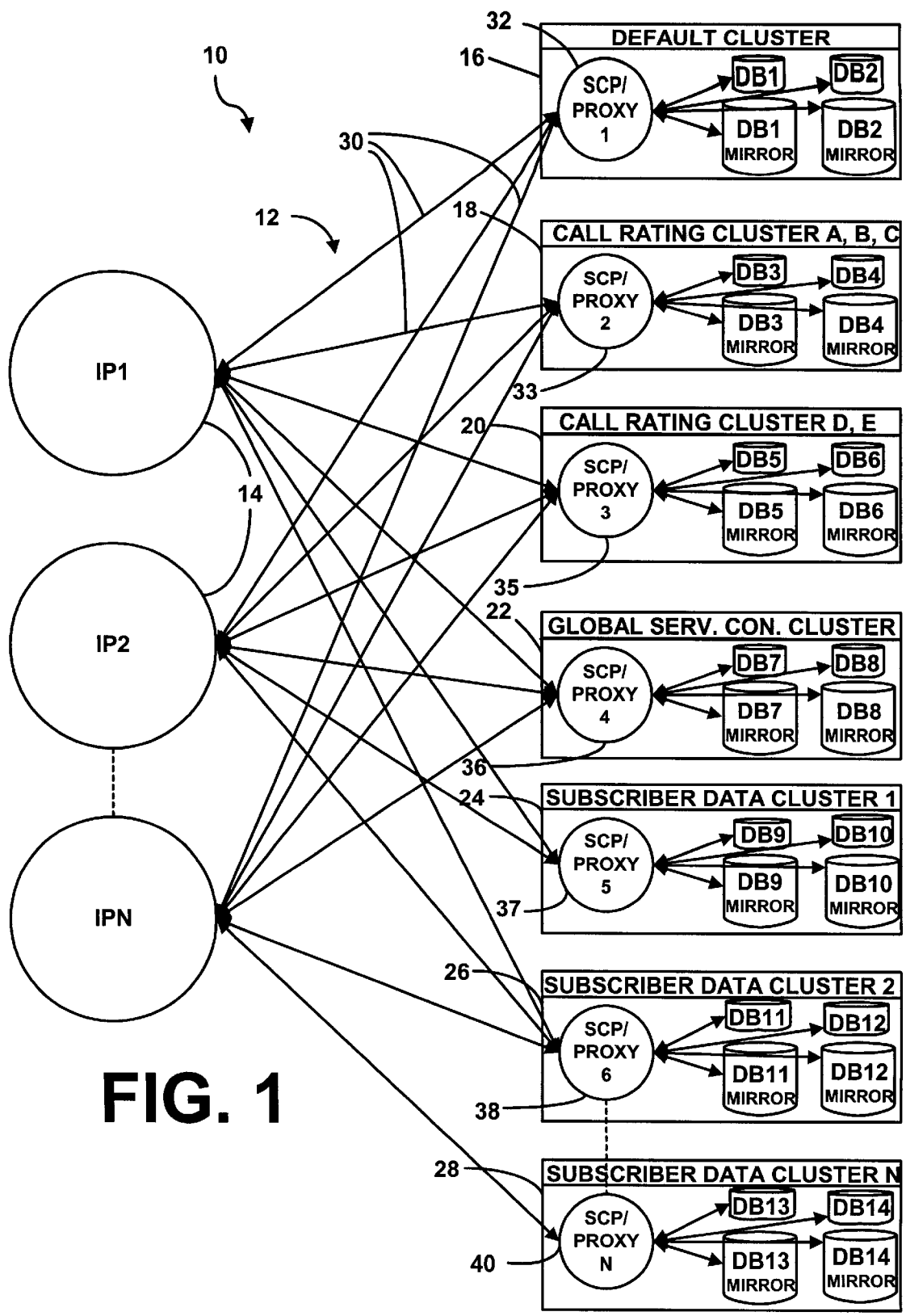
FIG. 1 is a diagrammatic view of multiple IP's accessing multiple databases through channels within the database system of the present invention.

The present invention creates a database architecture which permits a multitude of database servers to be shared by a multitude of IP's that will allow the following to occur:

1. IP's can connect to and utilize a multitude of database solutions (including SCP's) simultaneously, with no vendor-specific drivers and components.
2. Any IP can utilize data in any database server through
    a channel map where:
    a. Channel is determined by type of data requested;
    b. Channel is determined by service circuit;
    c. Channel is determined by DNIS of a call;
    d. Channel is determined by address entered by user;
    e. Channel is determined by OCN/Redirect of a call;
    f. Channel is determined by ANI of a call; and
    g. Channel is determined by progress indicators.
3. Database Channels will provide universal transaction pipes where:
    a. All data traversing channels is converted to configurable machine specific formats upon entering or leaving the channel, including:
        1. CMIP over TCP/IP,
        2. SNMP over TCP/IP,
        3. TCAP over SS7,
        4. TCAP over TCP/IP (TR 1129+),
        5. ROSE over SS7,
        6. Raw Big Endian Ordered transfer,
        7. Raw Little Endian Ordered transfer; and
    b. Default field values can be established based on channel utilized for every type of record. This provides consistent data between discordant databases.
4. Dynamic management of database server access permits:
    a. Adding additional databases on the fly;
    b. Controlled access to permit scheduled maintenance of existing database instances;
    c. Changeable default fields on a channel by channel basis; and
    d. Changing destination of database in real-time, permitting existing database to be rebuilt and activated in real-time.
5. All data fields will be turned into a handful of universal storage types where:
    a. Storage types will define conversion mechanisms; and
    b. storage types will define update mechanisms
6. All communication between the database and the IP will be managed by an OSI compliant session and transport layers. Data messages will conform to CMIP, SNMP, TCAP, ROSE, or Raw.

7. IP servers will manage the IP side of the channel where:
   a. The server will maintain cache coherency on IP;
   b. The server will provide standard database records and formats utilized by the IP;
   c. The server will overlay default fields upon reading a record;
   d. The server will convert database requests to configurable binary formats;
   e. The server will maintain performance characteristics for each channel, complete with network management functions for alarming when performance is substandard; and
   f. The server will provide continuous connection to a redundant location if the channel performance becomes inadequate.
8. Proxy servers will manage the remote database side of the channel where:
   a. The proxy will forward configuration changes to manage cache coherency;
   b. The proxy will execute database specific programs to perform the transactions requested;
   c. The proxy will convert encoded transactions to native transactions suitable for the database; and
   d. The proxy will omit any fields not stored in the database.
9. Transactions will be turned into field-by-field relative changes where:
   a. All locking of records and fields will not be required; and
   b. Only fields that have replacement or incremental changes will be transacted.
10. Legacy databases can be utilized and accessed through a channel where:
    a. Logical defaults provide intelligent default settings for missing data fields; and
    b. Proxy servers will convert and adjust legacy data to requirements of IP.
11. All database maintenance (creates, deletes, administrative updates) can be performed externally, which means:
    a. External tools (SQL) maintenance routines are utilized;
    b. General purpose reports are written using external tools;
    C. Database maintenance is performed externally as well; and
    d. Only runtime access for data records is necessary.
12. All data records and fields will be identified by an O.I.S. compliant identification system.

Referring now to FIG. 1, the telecommunications switching system 10 of the present invention is shown. The system 10 includes a network or medium 12 (e.g., SS7, TCP/IP, etc.) that interconnects a plurality of IP platforms 14 to a plurality of databases 16–28. The network 12 includes, but is not limited to, a plurality of channels 30. The channels 30 interconnect each IP 14 to every database 16–28 on the network 12.

A default database 16 stores channel maps (see FIG. 2) containing all of the information of every type of data record used by the IP platforms 14 and the channels 30 associated with the record types. A series of default fields are also contained logically within each channel map configuration. The default fields are listed for every record type utilized by the IP platform 14, and are supplied to the IP platform if otherwise missing.

The default database 16 also stores physical channel configuration information about each physical channel 30 in the network 12. The physical channel configuration information contains all of the data required to access the databases 18–28. Typically, this information contains the address and location of a primary SCP/proxy server 32–40, secondary server, and other data as needed to configure a communication link between an IP platform 14 and a database 18–28. For example, whether the network is SS7 or Transmission Control Protocol/Internal Protocol (TCP/IP), whether the session layer is Common Management Information Protocol (CMIP), Remote Operations Service Element (ROSE), Transactional Capabilities Application Protocol (TCAP), or Simple Network Management Protocol (SNMP). The location of the databases 18–28 may be expressed as a SS7 point code, TCP/IP address, or a logical name which is resolved to one of these. If resolution of logical name to physical address is required, Global Title Translation for SS7 networks is used, and a Domain Name System (DNS) Name Server is utilized in TCP/IP addresses. If redundant or multiple servers are managed by SCCP SS7 software, this fail-over mechanism is employed.

The databases 18–28 store data records necessary to carry out transaction requests received by the IPs 14. Some examples of data records are Call Rating data records (partitioned into databases 18 and 20), Global Service data records (stored in database 22), and subscriber data records (stored in database 24–28). It should be noted that one skilled in the art would recognize that databases containing additional data records could be incorporated into the system 10 of the present invention.

In operation, a transaction request message is sent to the IP platform 14. The transaction request may be a caller using a calling card, dialing an 800 number, checking voicemail, or making some other telecommunication request. An IP server process (not shown) within IP platform 14 receives the transaction and processes the transaction. Process steps include journaling the transaction for replication to a standby IP server process, updating statistical counters, performance monitoring tables, etc. . . . , and accessing a database map from the cache memory or default database if necessary. The transaction is converted to the session layer format, and transported via a selected channel of the defined network 12 to the proxy server 32–40 of a relevant database 18–28. The IP 14 then waits for a response. Note that in the general case, the servers within the IP platforms 14 are not single-threaded and can handle any number of outstanding database requests.

The proxy server 32–40 receives the transaction request, and decodes the request into the format required by the resident database 18–28. Typically, this is decoded into fields, and then a user interface is used for raw access to the SQL database. For example, when Oracle is used, OCI programmers interface is used. The transaction is then performed against the database. The results of the transaction are then returned to the IP 14 after being coded for transport and session layers. It should be noted that a proxy server 32–40 may not be required if the database mechanism 18–28 supports ROSE or TCAP transactions natively.

The server within IP platform 14 receives the response, decodes the response into local formats, overlays the default fields (received from the default database 16 and stored in a cache memory) for the particular record accessed, and then forwards the completed transaction to the requesting process within the IP platform 14.

Figure 2:
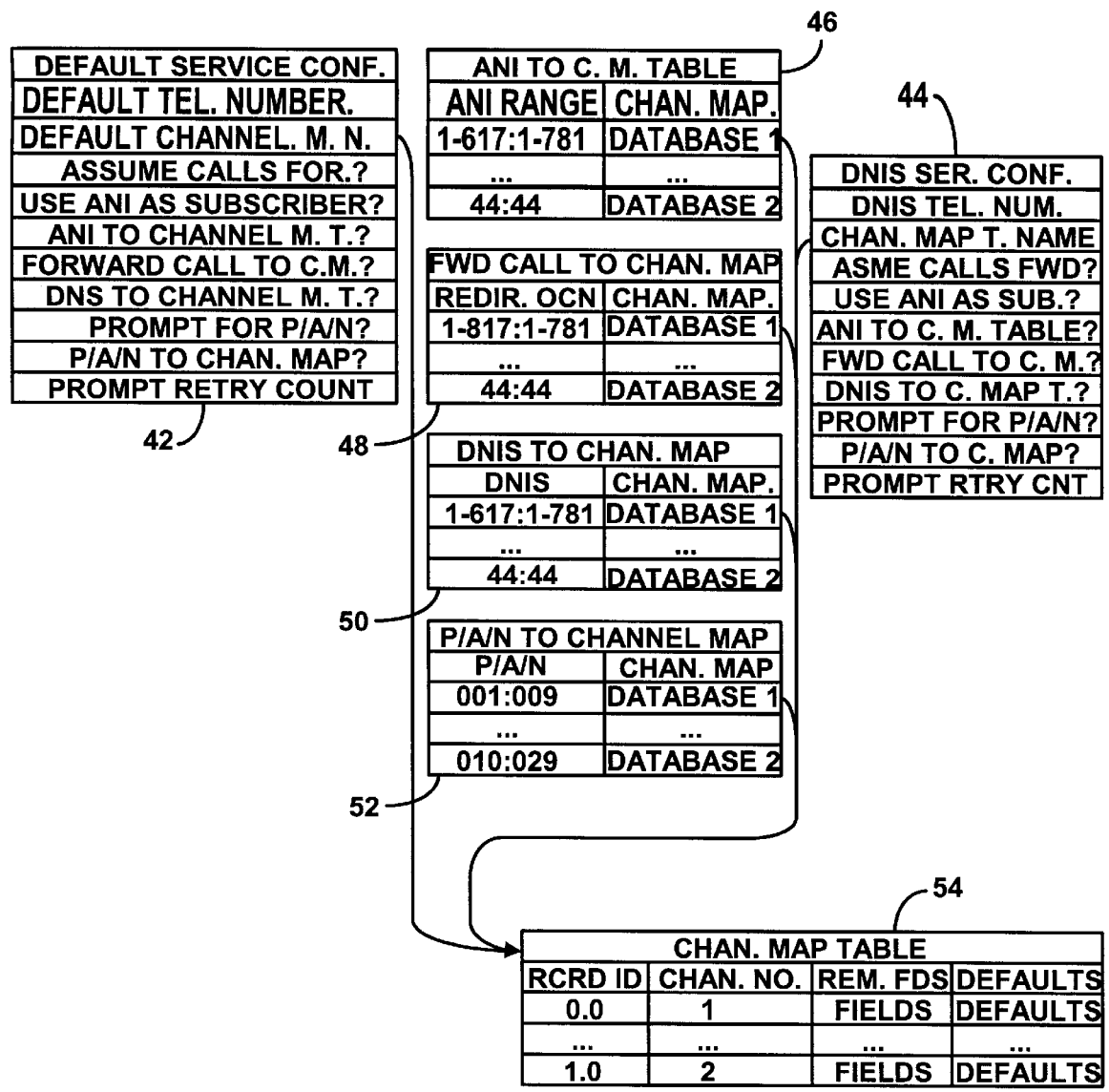
FIG. 2 is a diagram illustrating the elements utilized to determine a data channel within the database system of the present invention.

Referring now to FIG. 2, the relationship of the configurations and maps utilized by the IP platform 14 for channel selection is illustrated. Generally, there are two service configurations, one being a default service configuration 42 and the other being a DNIS service configuration 44. When a call or data request is received by the IP platform 10 of the present invention, the IP platform 10 will handle the request pursuant to the default service configuration 42 or the DNIS service configuration 44, as discussed in the description of FIGS. 4A–4E. The default service configuration 42 and the DNIS service configuration 44 contain a number of channel map tables 46–52. In operation, the IP platform 10 selects the channel map table 46–52 based on the selected service configuration 42 or 44 and data received from the incoming call or request. The channel map tables may include, but are not limited to, the ANI-to-Channel map table 46, the FWD Call-to-Channel map table 48, the DNIS-to-Channel map table 50, and the PIN/Acct/Number-to-Channel map table 52. A selected channel map table 54 contains the channel number that corresponds to a requested record, a list of remote fields associated with the channel, and a list of default fields to combine with the data request if the request is missing necessary data fields. The selected channel map 54 also contains a channel configuration table 56 that lists the protocol associated with each channel, the address of the primary SCP/proxy server, and the address of the secondary SCP/proxy server.

Determination of Channel Selection

FIGS. 4A–4E illustrate the determination of a channel through which to route a requested database transaction. As shown, FIGS. 4A–4E depict the determination of a channel in response to an inbound call. Although a channel determination in response to a requested administrative action is not shown, such a determination is very similar to channel determination in response to an inbound call.

Before describing the flowcharts illustrated in FIGS. 4A–4E, some background discussion may be useful. Upon receiving an inbound call, a default configuration is loaded from a default database into the IP and the channel map is set to default values. The inbound call may be associated with a port of the IP that is configured to assume the call is forwarded. This is required for some installations which do not provide indications that calls are forwarded. If the progress indicator indicates that the call is forwarded, or direct, the "assume call is forwarded" overrides this setting. Otherwise, the forwarded or direct indication is utilized as supplied from the network. The forward or direct characterization of the call is important as it dictates whether or not the actual DNIS should be used for determining the channel map.

Every inbound call will have either an explicit or implicit dialed number. The dialed number can be used to determine one of two possibilities. The first is that it matches a subscriber on the system. If that is the case, the "implicit" dialed number associated with the port group is used to determine which channel map to use. If the explicit dialed number matches a "service starting telephone number" registered with the platform, then the starting service is defined, and the process continues.

Often, calls arrive after forwarding or redirecting from another location. The originally dialed number may actually represent the "subscriber" or "service starting number". This is the general way enhanced services are provided. Thus a call to a subscribers home is unanswered, and forwards to the "voice messaging" system after a certain number of rings. The call will be presented by the network with either an Original Calling Number (OCN) or a Redirecting Number which identifies the subscriber number. The channel to use in these cases will be determined by the number the call is forwarded to (the actual DNIS) or the number associated with the port the inbound call arrives on (implicit DNIS) if the actual or implicit DNIS matches a service configuration.

Certain applications require looking at the source of the call. For example, in cellular debit calling applications (prepaid service), the origin of the call (ANI) determines who is paying for the call. Thus the ANI represents the subscriber account, and the channel is determined by either the explicit DNIS or the implicit DNIS. To permit inbound ports to be used for multiple applications, the starting service may upon failure to locate a subscriber, provide other services for the inbound call.

Finally, often none of the network supplied data is sufficient for determining either the channel map or the subscriber. In these cases, the channel map to use is based on the inbound explicit DNIS or implied DNIS, and the call is answered. The caller is then prompted to identify themselves. The channel map to use is determined by the DNIS or implied DNIS.

Figure 4A:
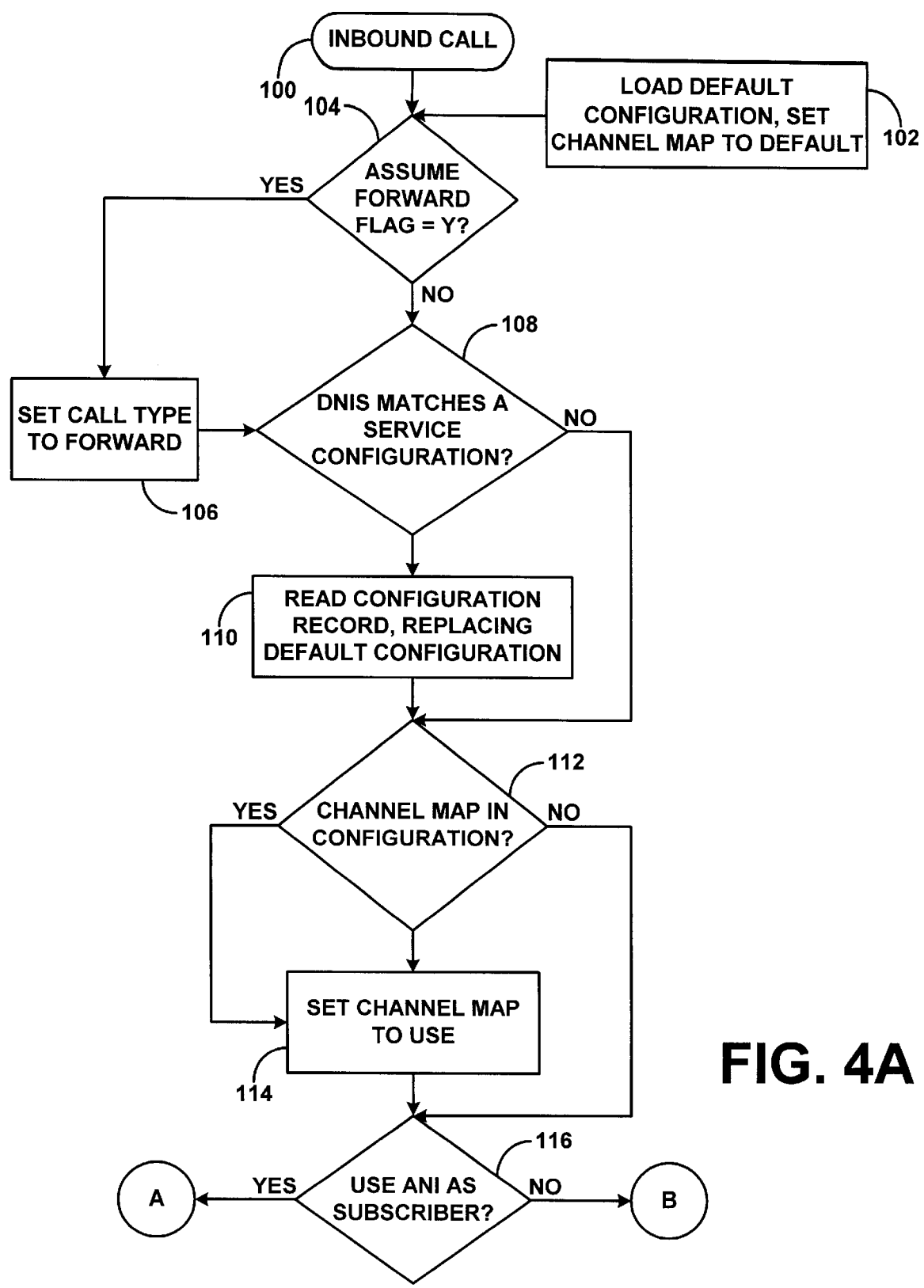
FIGS. 4A–4E are flowcharts illustrating the method of channel selection within the database system of the present invention.

Turning now to FIG. 4A, upon receiving an inbound call (step 100) the IP loads a default configuration and selects a default channel map based on the default configuration (step 102). The IP then determines if it is programmed to assume that the call is forwarded (step 104). If so, the call type is set to forward (step 106) and the DNIS is checked to see if it matches a service configuration (step 108). If not, the DNIS of the call, supplied by the network, is checked to see the if it matches a service configuration (step 108). If the DNIS matches a service configuration the IP reads the configuration record and replaces the default configuration (step 110).

Afterwards, the new configuration is checked to see if the configuration contains a channel map to use (step 112). If the configuration contains a channel map to use the IP selects a channel map for use (step 114). As shown in FIG. 2 and FIGS. 4B–4E, the channel map may map out databases based on ANI (FIG. 4B), Redirect/OCN (FIG. 4C), or DNIS information (FIG. 4D) supplied by the incoming call or based on a PIN, account, or phone number (FIG. 4E) supplied by the caller in response to a prompt.

Next, the IP checks to see if the ANI of the incoming call corresponds to a subscriber (step 116) if the configuration does not contain a channel map for use or after the IP selects a channel map for use (see step 114). If the ANI does correspond to a subscriber, the IP proceeds through the routine illustrated in FIG. 4B. If the ANI does not correspond to a subscriber, the IP proceeds through the routine illustrated in FIG. 4C.

Figure 4B:
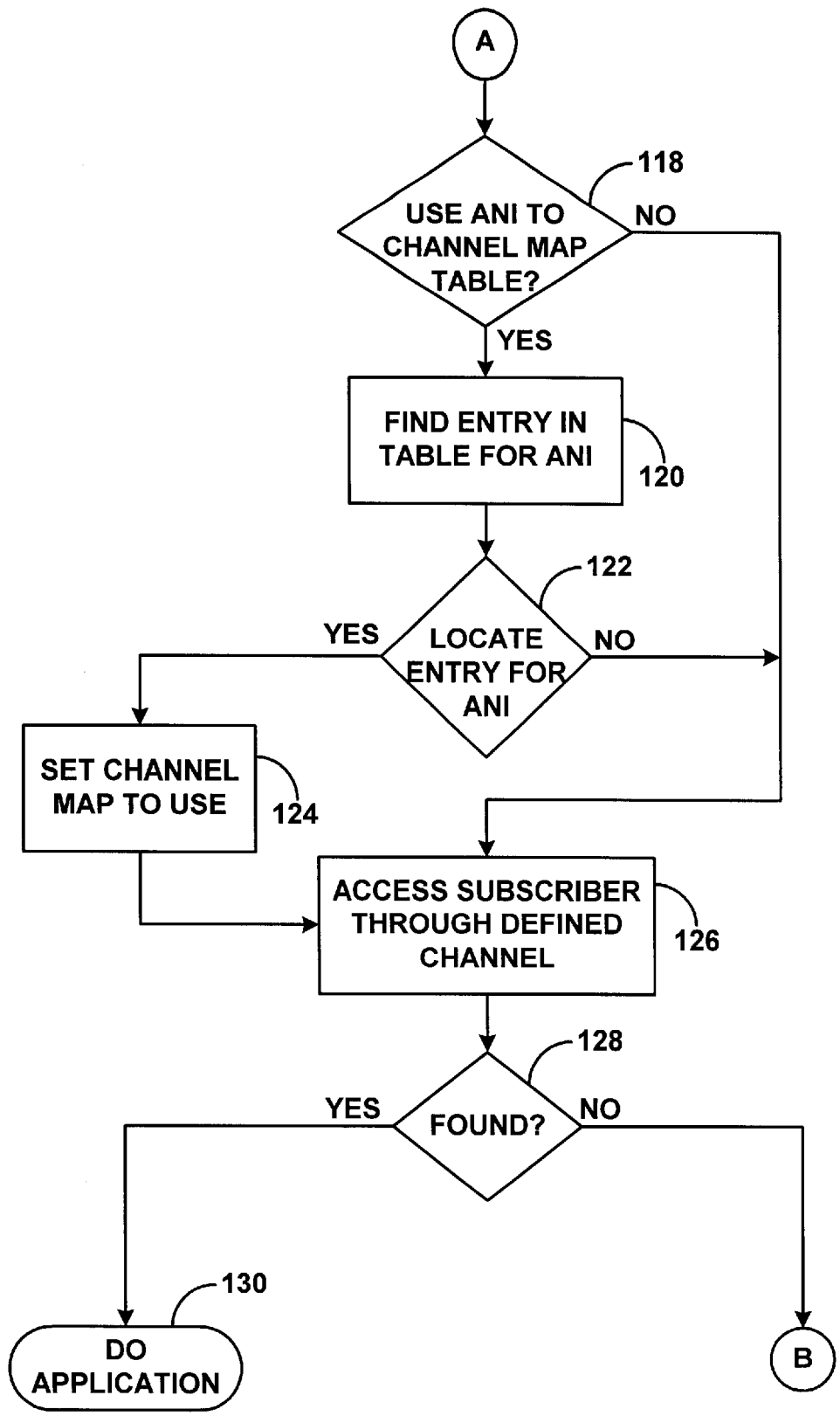

Turning now to FIG. 4B, the IP views the channel map (set in step 114) to determine if the ANI-to-Channel map table is set for use (step 118). If the ANI-to-Channel map table is not set for use, the IP's attempt to access the subscriber information (steps 126 and 128) will fail and the IP will proceed to the routine illustrated in FIG. 4C. If the ANI-to-Channel map table is set for use, the IP will search the ANI-to-Channel map table for an entry that corresponds to the ANI of the incoming call (step 120). If no entry is located, the IP's attempt to access the subscriber information (steps 126 and 128) will fail and the IP will proceed to the routine illustrated in FIG. 4C. If an entry is located (step 122), the IP selects the channel that connects to the database corresponding to the ANI of the incoming call (step 124). Afterwards, the IP attempts to access the subscriber information via the selected channel (step 126). If the subscriber information is found (step 128), the IP carries out the application requested by the incoming call (step 130). If the subscriber information is not found, the IP proceeds to the routine illustrated in FIG. 4C.

Figure 4C:
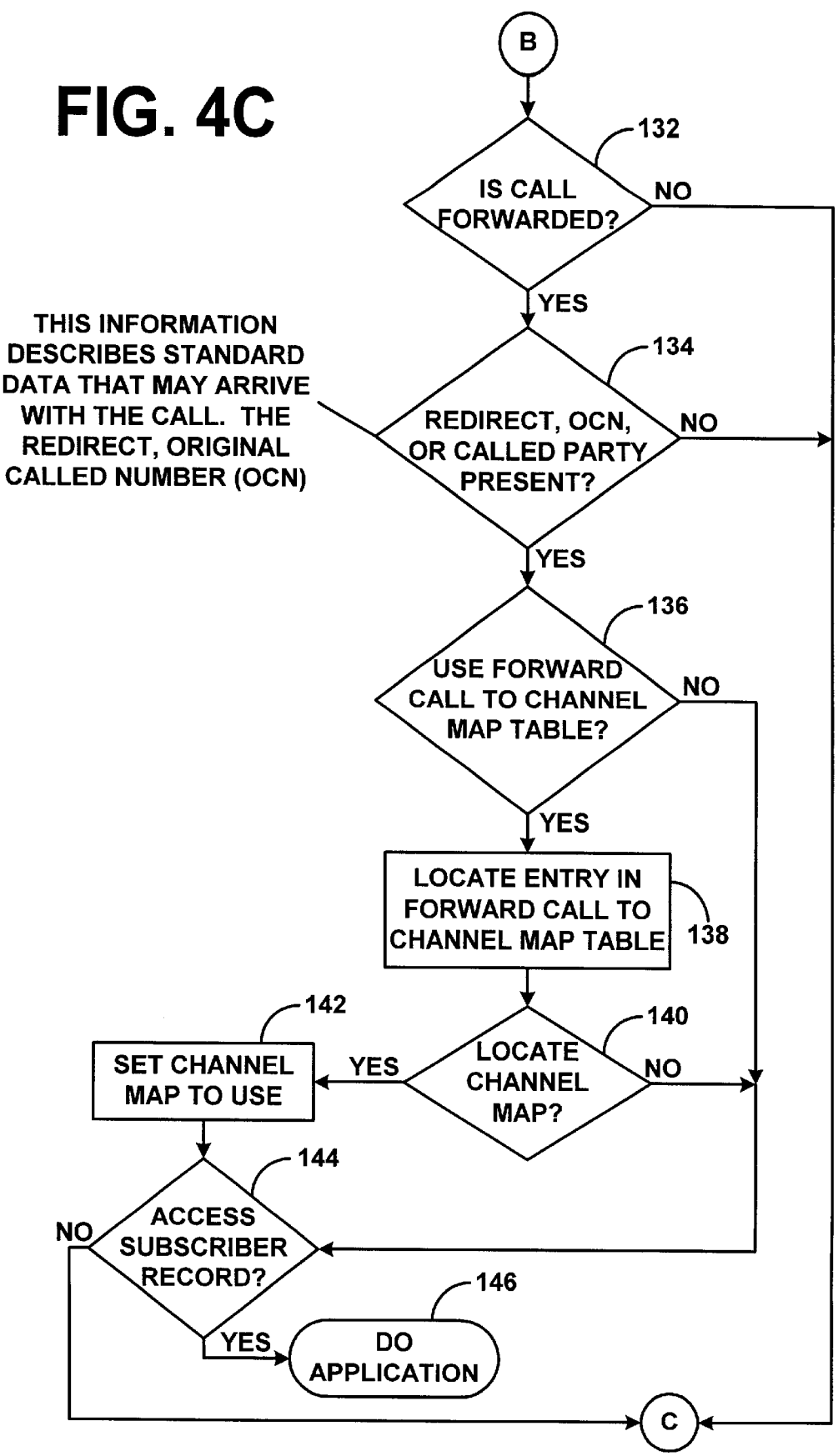

Turning now to FIG. 4C, the IP determines if the call is forwarded (step 132). If the call is not forwarded, the IP proceeds with the routine illustrated in FIG. 4D. If the call is forwarded, the IP determines if the redirect number or the original called number (OCN) information is available (step 134). If not, the IP proceeds with the routine illustrated in FIG. 4D. If so, the IP views the channel map (set in step 114) to determine if the Forward Call-to-Channel map table is set for use (136). If the Forward Call-to-Channel map table is not set for use, the IP's attempt to access a subscriber record (step 144) will fail and the IP proceeds with the routine illustrated in FIG. 4D. If the Forward Call-to-Channel map table is set for use, the IP will search the map table for an entry that corresponds to the Redirect Number or OCN of the incoming call (step 138). If no entry is located, the IP's attempt to access a subscriber record (step 144) will fail and the IP proceeds with the routine illustrated in FIG. 4D. If an entry is located (140), the IP selects the channel that connects to the database corresponding to the Redirect Number or OCN of the incoming call (step 142). Afterwards, the IP attempts to access a subscriber recorder via the selected channel (step 144). If the subscriber record is found, the IP carries out the application requested by the incoming call (step 146). If the subscriber record is not found, the IP proceeds to the routine illustrated in FIG. 4D.

Figure 4D:
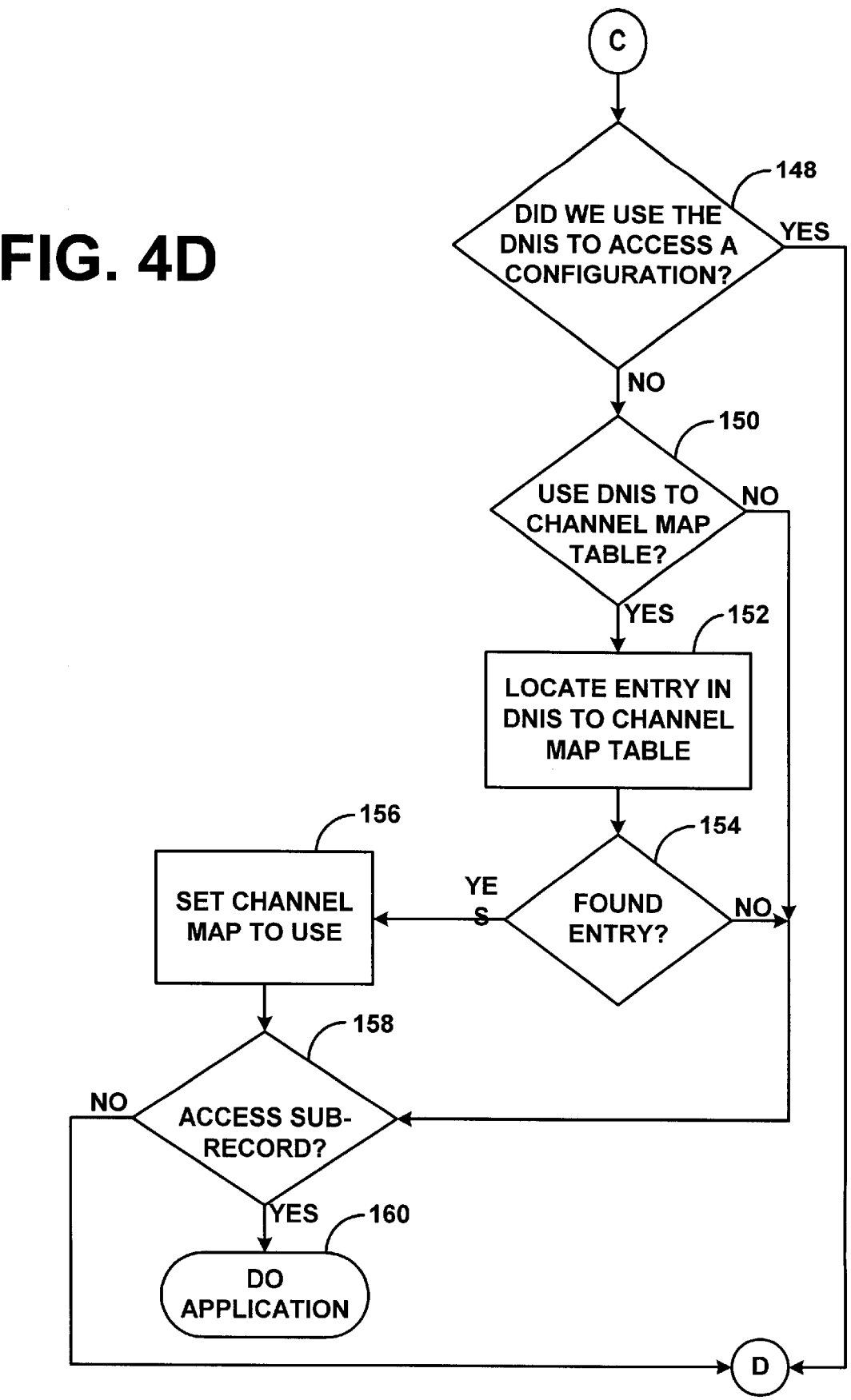

Referring now to FIG. 4D, the IP determines whether the DNIS was used to access a configuration (step 148). If so, the IP proceeds to the routine illustrated in FIG. 4E. If not, the IP views the channel map (set in step 114) to determine if the DNIS-to-Channel map table is set for use (step 150). If the DNIS-to-Channel map table is not set for use, the IP is unable to access a sub-record (step 158) and the IP proceeds to the routine illustrated in FIG. 4E. If the DNIS-to-Channel map table is set for use, the IP will search the DNIS-to-Channel map table for an entry that corresponds to the DNIS of the incoming call (step 152). If no entry is found, the IP is unable to access a sub-record (step 158) and the IP proceeds to the routine illustrated in FIG. 4E. If an entry is found (step 154), the IP selects the channel that connects the database corresponding to the DNIS of the incoming call (step 156). Afterwards, the IP attempts to access a sub-record via the selected channel (step 158). If the sub-record is found, the IP carries out the application requested by the incoming call (step 160). If the subscriber record is not found, the IP proceeds to the routine illustrated in FIG. 4E.

Figure 4E:
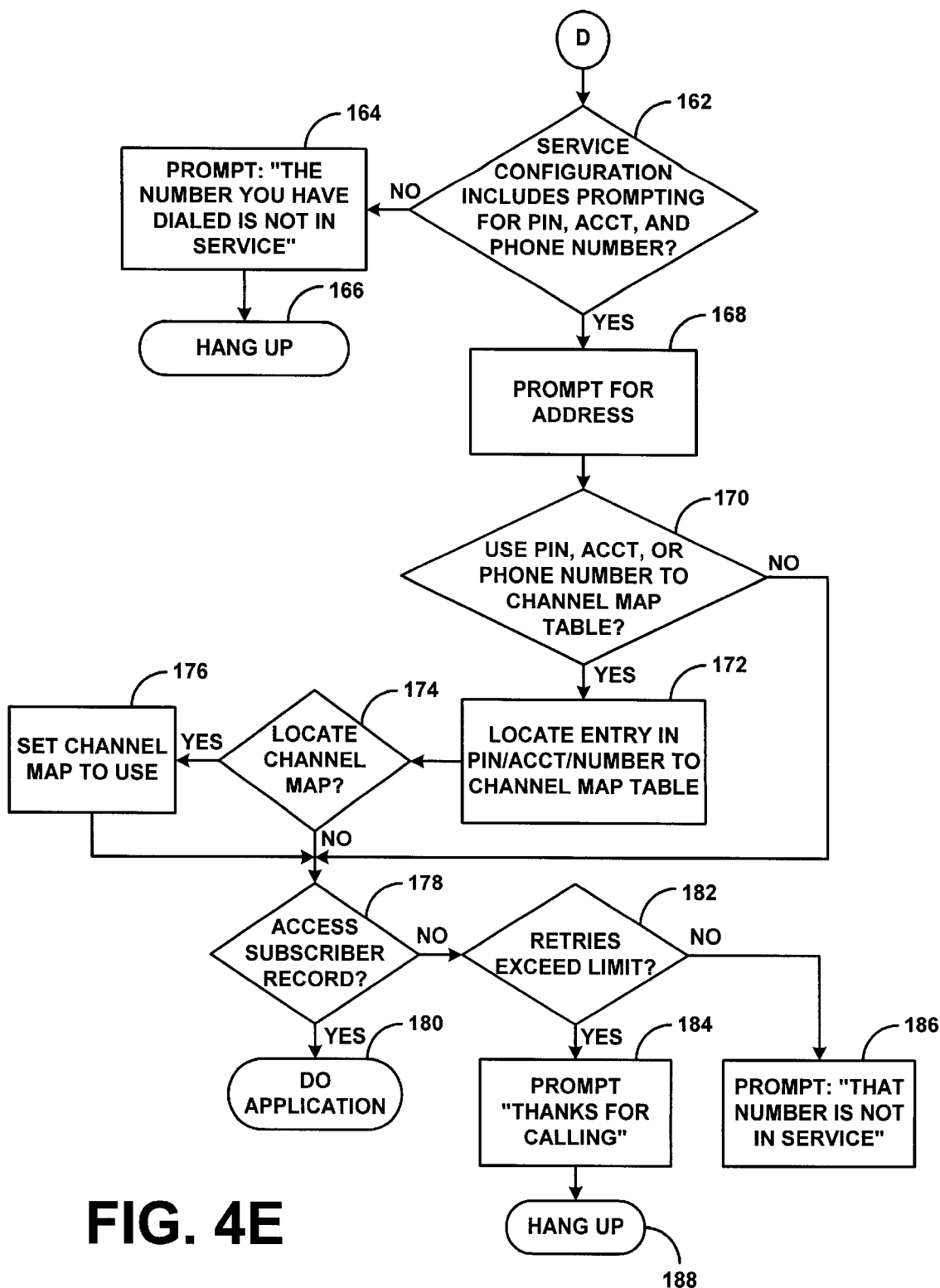

Referring now to FIG. 4E, the IP determines whether the configuration record includes the service of prompting the caller for a PIN, account number, and/or phone number (step 162). If not, the caller is informed that the number the caller has dialed is not in service (step 164) and the IP disconnects from the call (step 166). If so, the caller is prompted for a PIN, account number, and/or phone number (step 168). Afterwards, the IP views the channel map (set in step 114) to determine if the PIN/Acct/Number-to-Channel map table is set for use (step 170). If the PIN/Acct/Number-to-Channel map table is not set for use, the IP attempts, unsuccessfully, to access the subscriber record (step 178). If the PIN/Acct/Number-to-Channel map table is set for use, the IP will search the PIN/Acct/Number-to-Channel map table for an entry that corresponds to the PIN/Acct/Number of the incoming call (step 172). If an entry is found (step 174), the IP selects the channel that connects the database corresponding to the PIN/Acct/Number of the incoming call (step 176). Afterwards, the IP attempts to access a subscriber record via the selected channel (step 178). If the subscriber record is found, the IP carries out the application requested by the incoming call (step 180). If the subscriber record is not found, the IP determines how many attempts the caller has made to access the subscriber record (step 182). If the number of retries does not exceed a predetermined limit, the caller is prompted that the number is not in service (step 186). Afterwards, the caller is again prompted for a PIN, Account number, or phone number (step 168). However, if the number of retries exceeds a predetermined limit, the user is prompted with a thanks for calling (step 184) and the IP disconnects the call (step 188).

Identification of Records and Fields

The classification and identification of data types and fields is required to provide the channelized database. Most databases require field-by-field resolution of requests, where the fields fit into one of the database's defined types. For instance, if the database was an Oracle 7.2 database, integers may be converted into the DECIMAL type as required by the external database.

The classification and identification system of the present invention meets the following objectives:

1. allows the IP manufacturer to extend the number of record types seamlessly;
2. allows the IP User to extend the number of record types seamlessly;
3. allows the IP manufacturer to extend the number and types of fields within a defined record;
4. allows the IP User to add user-defined fields to existing manufactured defined records; and
5. allows the IP User to add user-defined fields to existing user defined records.

Figure 3:
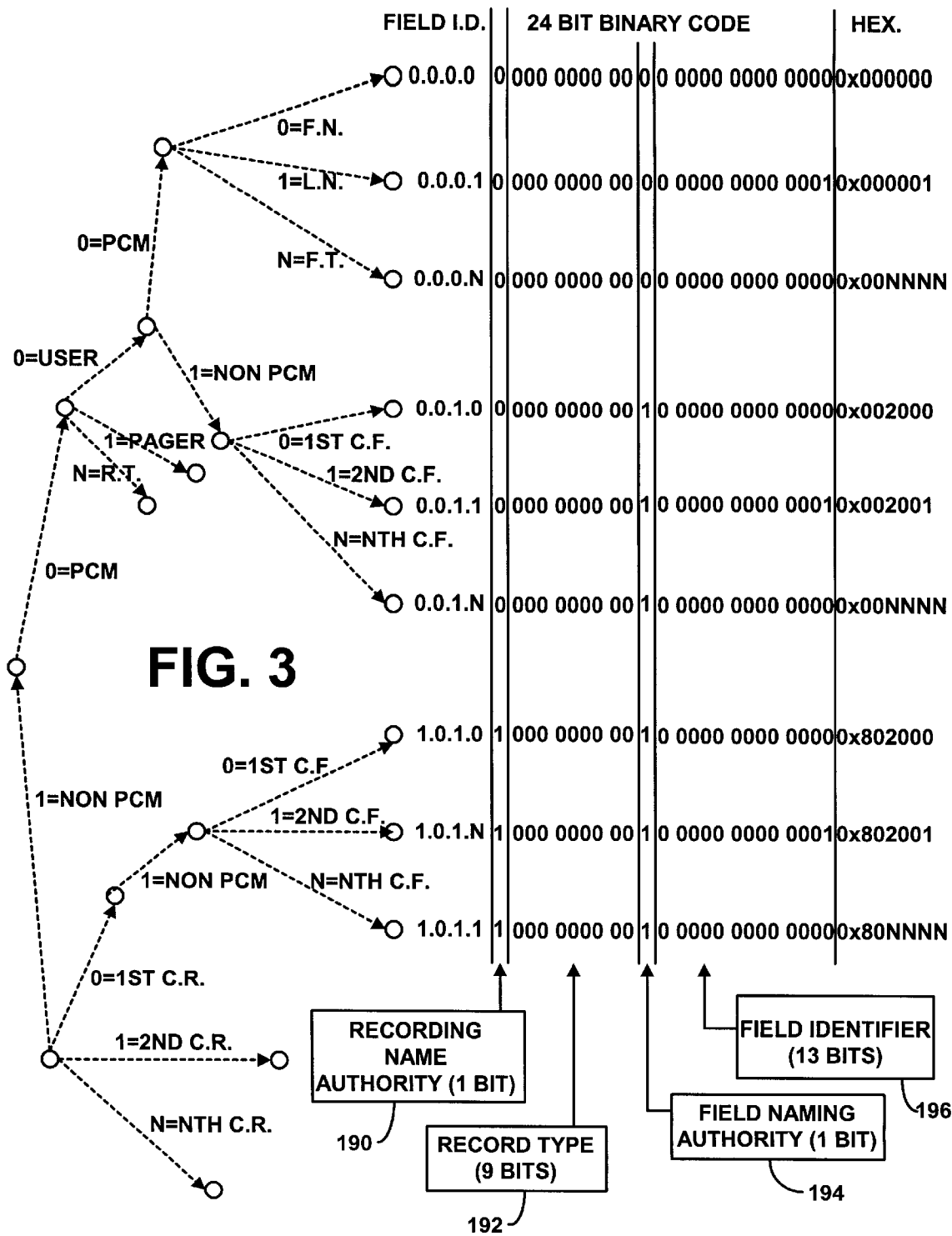
FIG. 3 is a diagram illustrating the record and field identification system of the present invention.

Referring now to FIG. 3, the identification scheme is graphically shown. The diagram on the left details a tree-structured approach to identifying the four required elements for identifying fields, and the two required elements for identifying records. Additionally, the chart on the right indicates how this is translated into a 24 bit representation of the identification for fields, and a 10 bit identification for records.

The first element in the address is the Record Naming Authority 190. This is set to zero when the record is named by the manufacturer of the IP, and one when the record is created for use by the IP User/Owner. This separates the record naming space into two distinct areas to prevent overlap. It is conceivable that the number of bits representing the Record Naming Authority 190 could be expanded to include any number of entities.

The second element is the record type 192. Each naming authority can create 512 different record types within the IP. By expanding the number of bits beyond nine, the number of records available for creation by any entity could be expanded seamlessly.

The first two elements describe all records uniquely. Records are simply a collection of fields which can be accessed via search keys. There does not have to be a one-to-one mapping of IP records to SCP records. The proxy server is responsible for returning IP records based on the request from the IP. Complete documentation of the records and fields required on the IP is important for proper interfacing to SCP databases.

The next two elements describe the field. Because fields all require the first two elements, fields can only be defined within the scope of a record.

The first element is the Field Naming Authority 194, which when set to zero indicates that the field is named and used by the IP Manufacturer. When set to 1, the field is named and used by the IP User/Owner. This permits fields to be inserted into the record which are not required by the IP, but can be carried with the record and utilized by service creation software on the IP. Thus, when obtaining a subscriber record, the SCP can insert additional subscriber data not utilized on the IP, and then scripting languages used to create specialized call flows can utilize this data. Additionally, this data can be placed into the outbound billing records generated by subscribers, even though the data field is foreign to the IP system.

The second element is the Field Identifier 196. This identifies the field within the record. There are 13 bits for identifying fields, providing 8192 separate fields within each record. This could be expanded as required. Each and every field identifier is assumed to be "immutable" for the life of the IP: if a field is no longer required for processing calls on the IP, the field identifier is retired, and never used again.

This record and field naming convention is required to process data correctly from remote SCP's and databases made by many different manufacturers. The unique method employed by the present invention provides significant advantages not currently used in the marketplace. These include:

1. Providing seamless field and record addition for Service Creation logic and billing purposes; and
2. Providing a mechanism for managing disparate versions of IP software being served by the SCP.

Because field I.D.'s are immutable, if the field contents change, a new I.D. can be allocated with the new contents.

Classification of Data Types into Universal Types

In order to connect to any database, the present invention has taken all data elements used in the IP and identified their lowest common denominator storage type (shown in FIG. 3). For example, the subscriber record has a first name, last name, department, and company. All of these fields are Text Strings, and share many if not all of the same properties. We have identified the universal types listed below.

1. TEXT—A text string (ASCII) which is null "/0" terminated. The string is variable length, with a maximum length permitted. (Shown in FIG. 6).
2. TELNUM—A complete telephone number. Each part of the number is stored separately. The country code, area or city code, the number, and the private network extension are all included. The number is convertible into any known format. (Shown in FIG. 7).
3. LONG—Contains a 32 bit integer. (Shown in FIG. 8).
4. SHORT—Contains a 16 bit integer. (Shown in FIG. 9).
5. BYTE—Contains an 8 bit integer. (Shown FIG. 10).
6. DECIMAL—Contains a number which has a decimal point. These are stored as two separate integers to avoid any problems with floating point math. (Shown in FIG. 11).
7. DB_REFERENCE—A reference to another database record. The reference may refer to data which exists in a different database, and in fact, very often does (Shown in FIG. 12).

Information Elements

Figure 5:
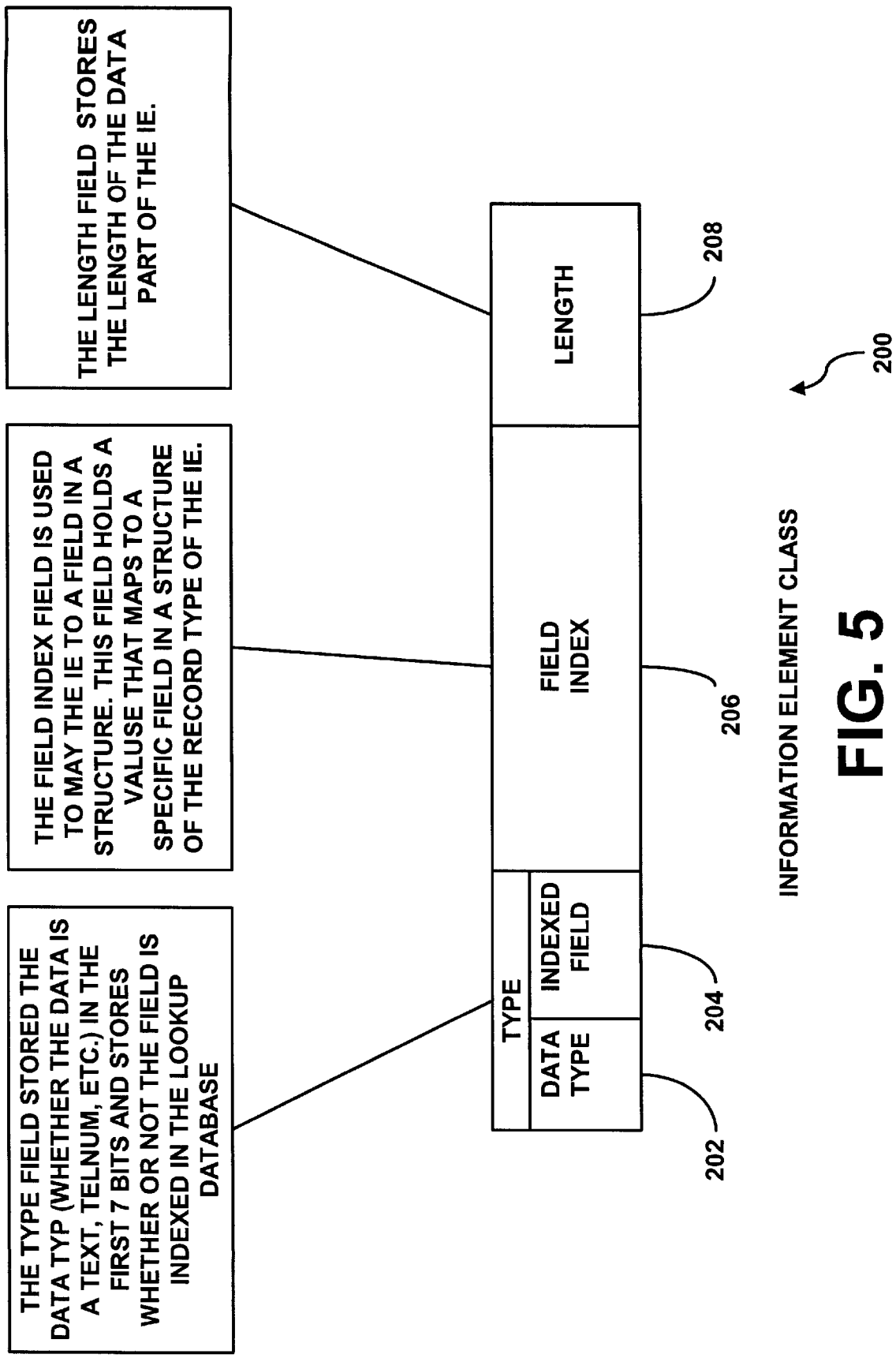
FIG. 5 is a diagram illustrating an information element utilized within the database system of the present invention.

To identify and contain the above fundamental storage types, the present invention utilizes a universal data container called an Information Element (IE) 200 (Shown in FIG. 5). The IE 200 is a data container used by many telecommunications protocols. Object oriented programming principles are used in the design of the IE 200. The Base Class, or foundation for the universal storage bin, is the Information Element Class. This class, shown in FIG. 5, contains the base information that every information element has. It also includes methods for handling information elements. The full C++ specification for the base class is shown in FIGS. 16A–16F.

Referring now to FIG. 5, the Information Element Class is the Base Class for all of the fundamental types stored in the database. The IE 200 contains information pertaining to the type of data 202, what field 204 in the record the data is, whether the current field is indexed 206 in the lookup database, and the length of the data portion. The information contained in the IE 200 is used to cast the data to the appropriate class and to use the methods defined for that class to carry out the specified action.

From the base class, storage containers are derived for each of the fundamental storage types. Special methods are added as required to instantiate, update, adjust, and delete these data elements in/from a data record.

Each of the fundamental types contains specific methods to carry out the required actions on that data. All of the fundamental classes contain methods to set, get, and display the member data elements. Certain fundamental classes contain special methods for accessing/updating member data. The Decimal Class (Shown in FIG. 11) is one such example. The Decimal Class contains a method to set the data to the given value wiping out the previously set value(Adjust Amount( )) and a method to add to the previously set numerical value (Update Amount( )).

Figure 6:
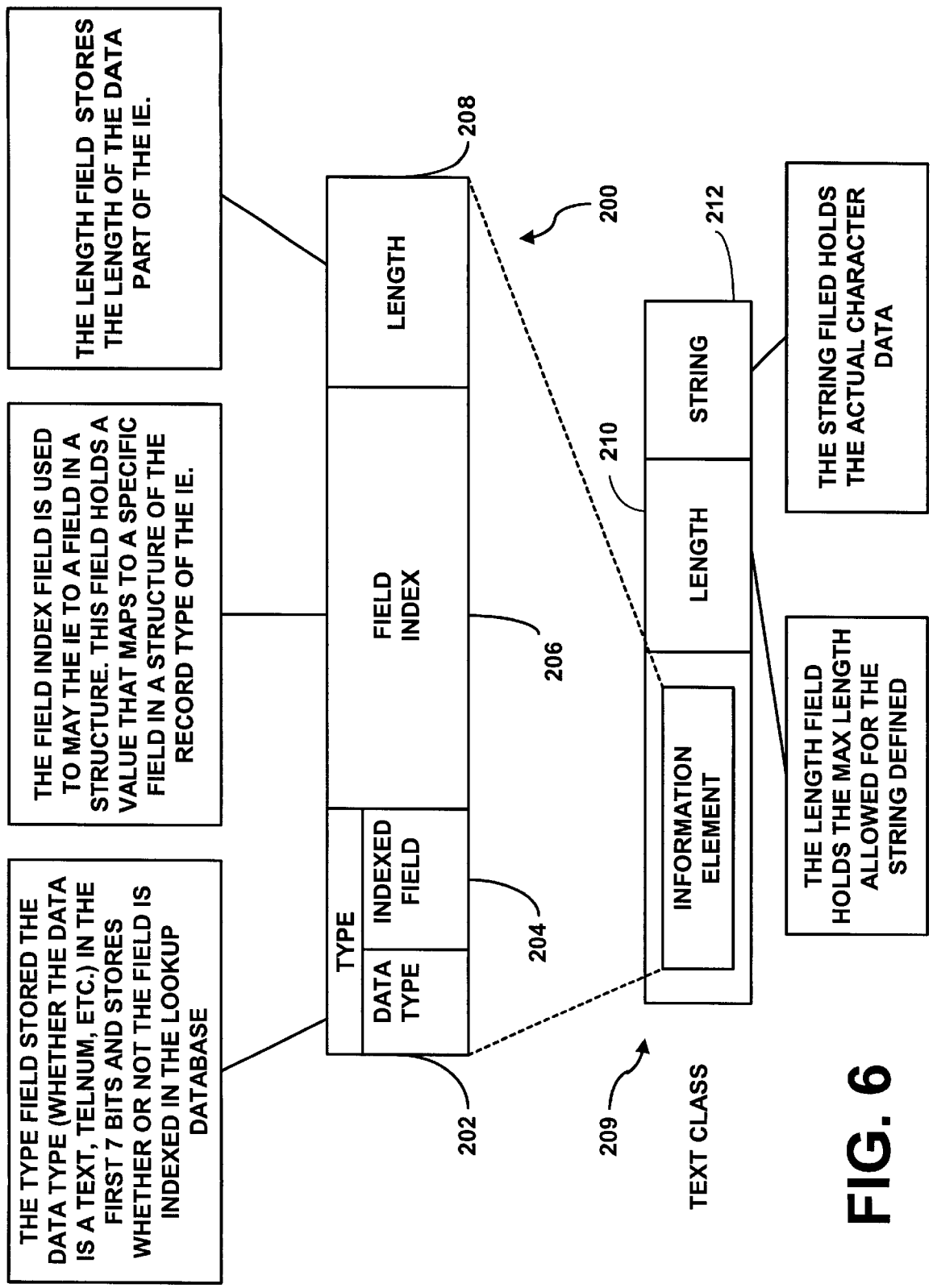
FIG. 6 is a diagram illustrating a text information element utilized within the database system of the present invention.

Referring now to FIG. 6, the text information element 209 is illustrated. The text information element includes IE 200, length field 210, and string field 212. The length field 210 contains the maximum length allowed for the defined string. The string field 212 contains the actual character data.

Figure 7:
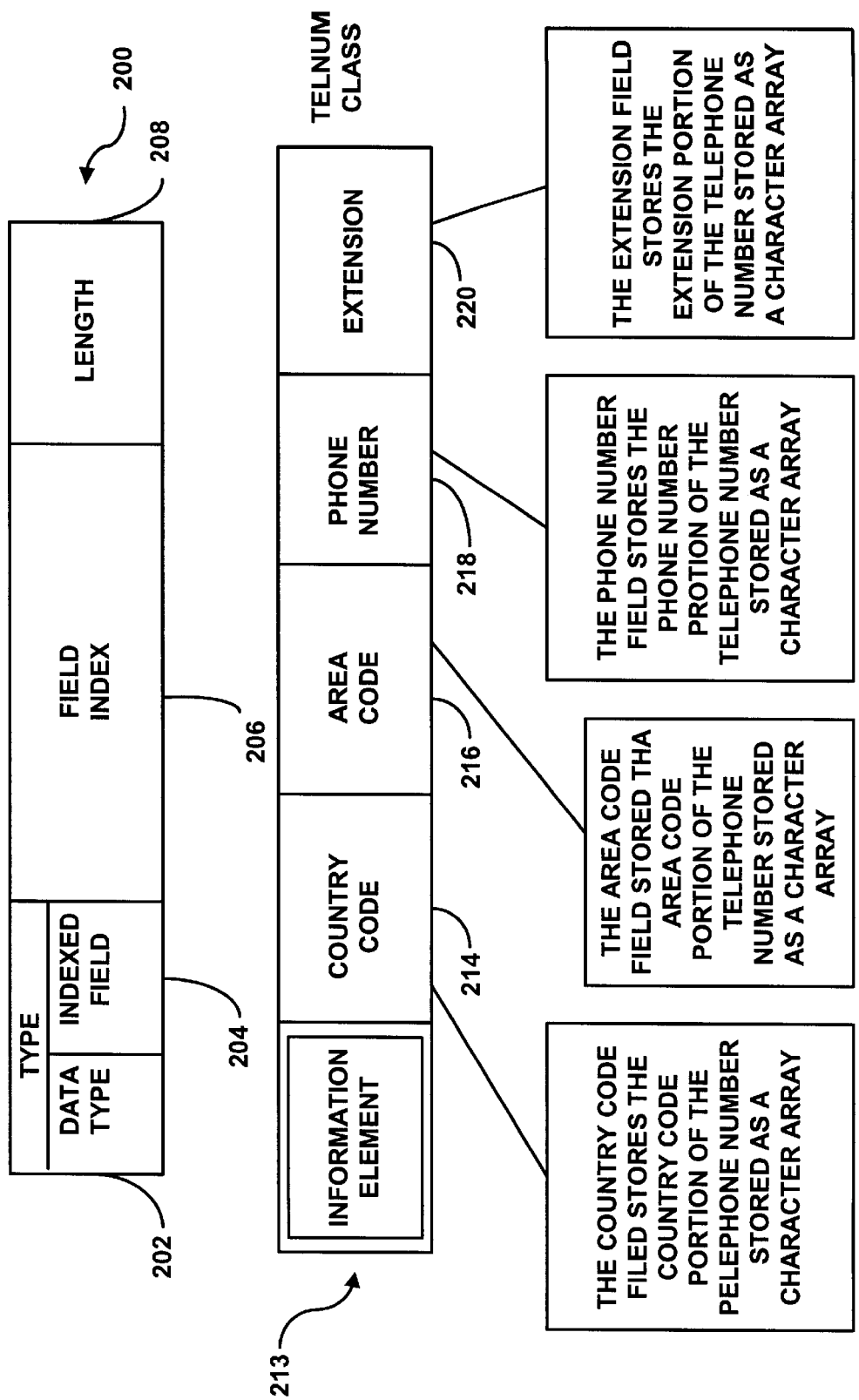
FIG. 7 is a diagram illustrating a telephone number information element utilized within the database system of the present invention.

Referring now to FIG. 7, the telephone number information element 213 is illustrated. The telephone number information element 213 includes IE 200, country code field 214, area code field 216, phone number field 218, and extension field 220. The country code field 214 stores the country code portion of the telephone number as a character array. The area code field 216 stores the area code portion of the telephone number as a character array. The phone number field 218 stores the phone number portion of the telephone number as a character array. The extension field 220 stores the extension portion of the telephone number as a character array.

Figure 8:
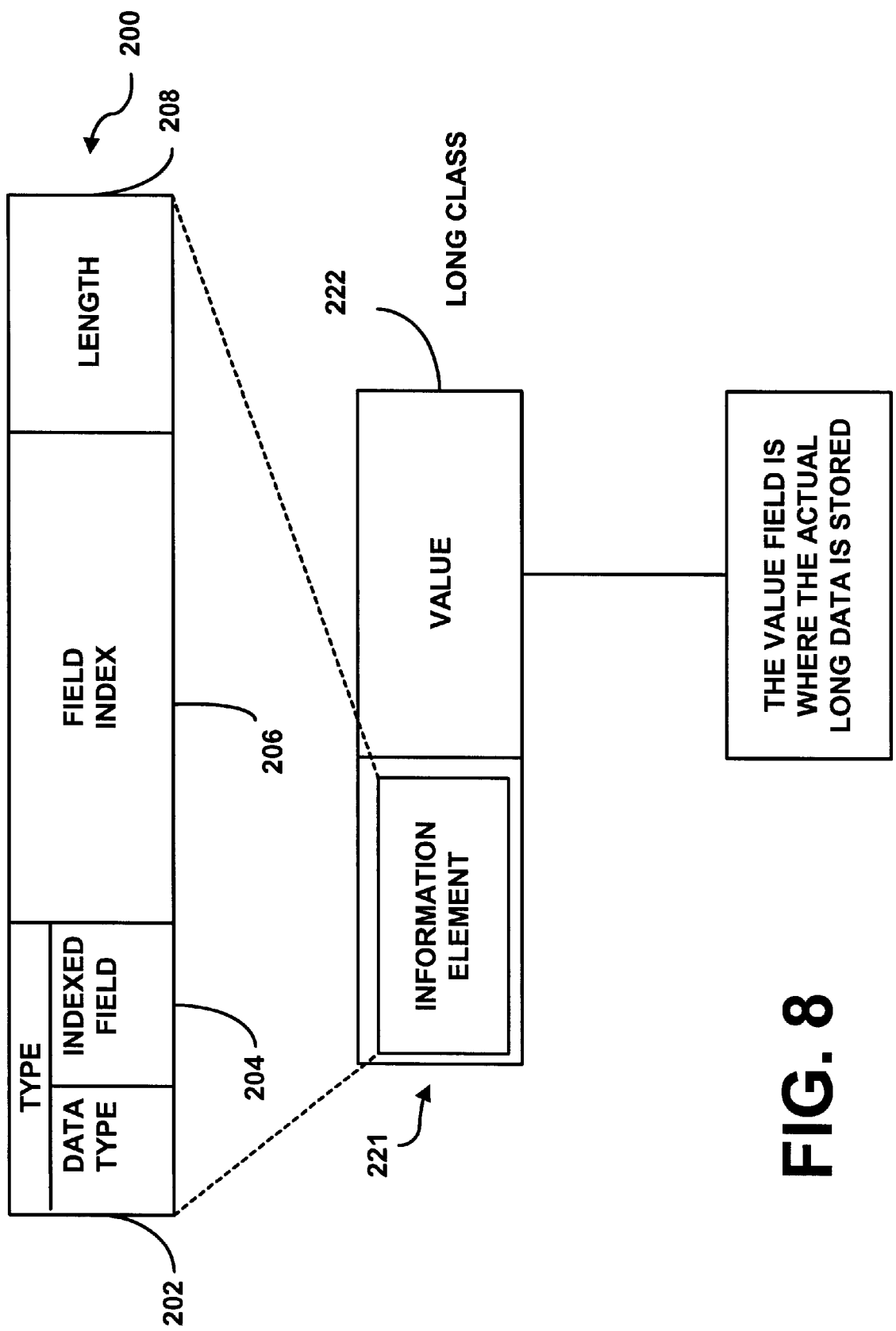
FIG. 8 is a diagram illustrating a 32 bit integer information element utilized within the database system of the present invention.

Referring now to FIG. 8, the 32 bit integer information element 221 is illustrated. The 32 bit integer information element 221 includes IE 200 and value field 222. The value field 222 stores long-length data.

Figure 9:
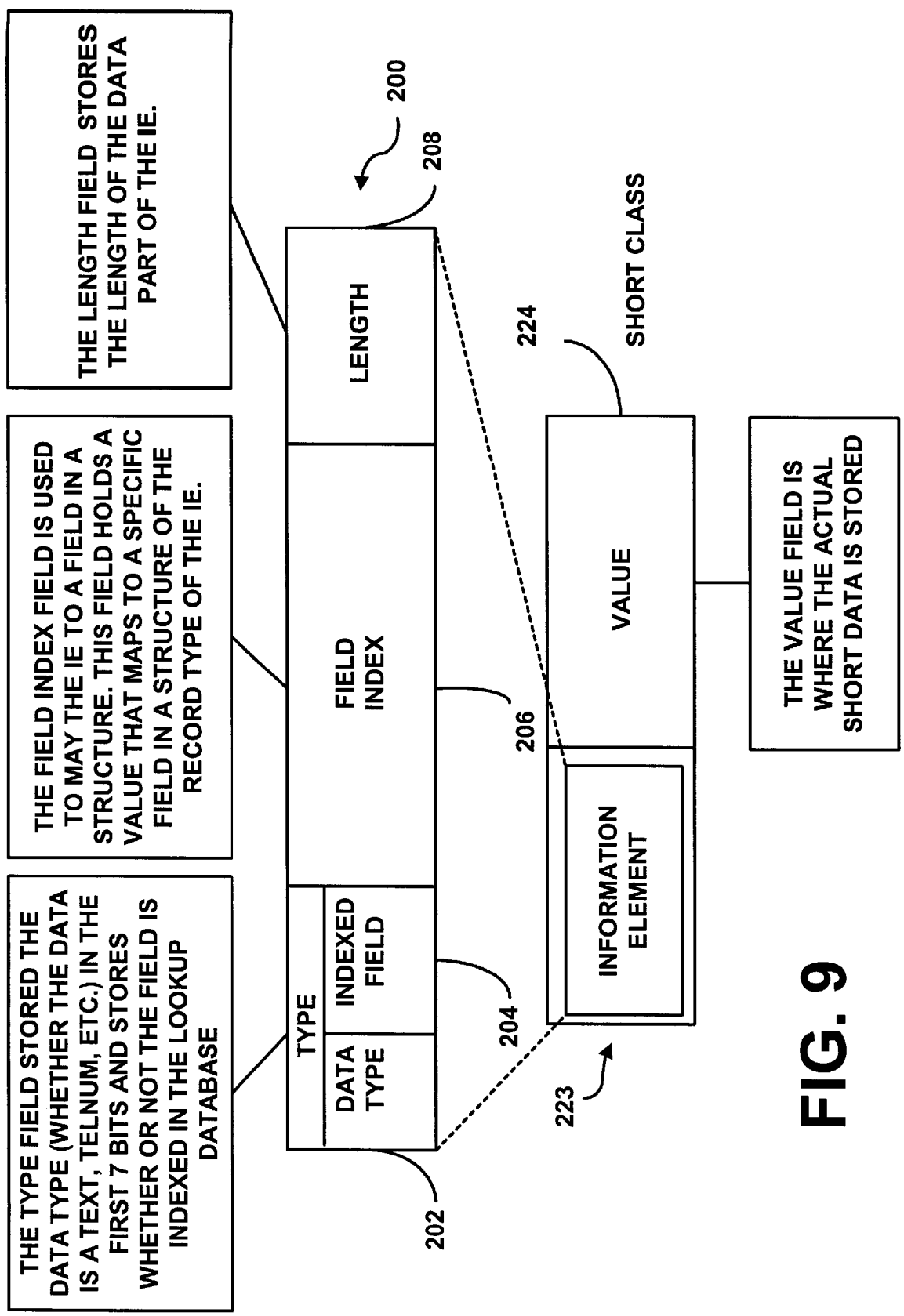
FIG. 9 is a diagram illustrating a 16 bit integer information element utilized within the database system of the present invention.

Referring now to FIG. 9, the 16 bit integer information element 223 is illustrated. The 16 bit integer information element 221 includes IE 200 and value field 224. The value field 224 stores short-length data.

Figure 10:
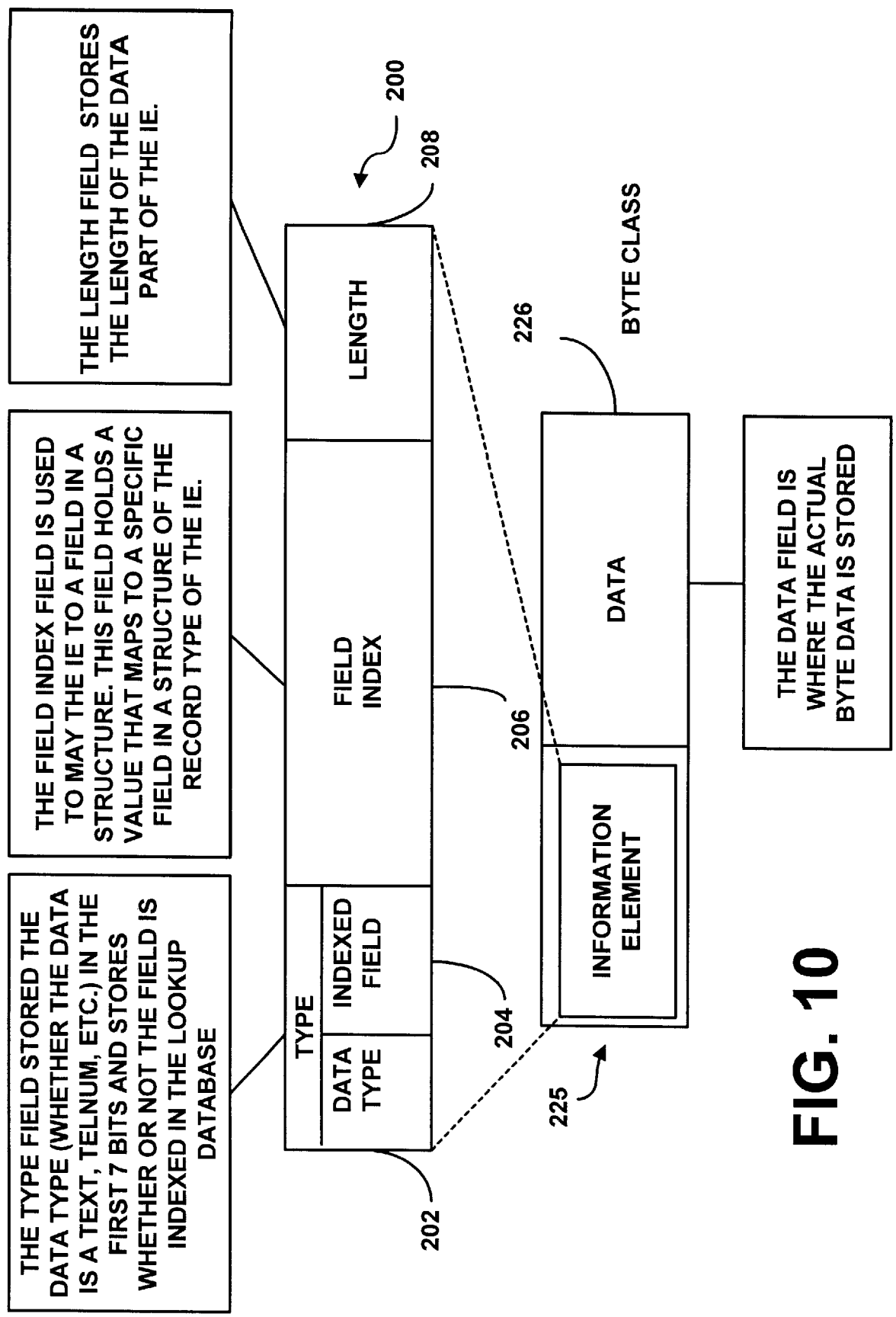
FIG. 10 is a diagram illustrating a 8 bit integer information element utilized within the database system of the present invention.

Referring now to FIG. 10, the 8 bit integer information element 225 is illustrated. The 8 bit integer information element 225 includes IE 200 and value field 226. The value field 226 stores byte-length data.

Figure 11:
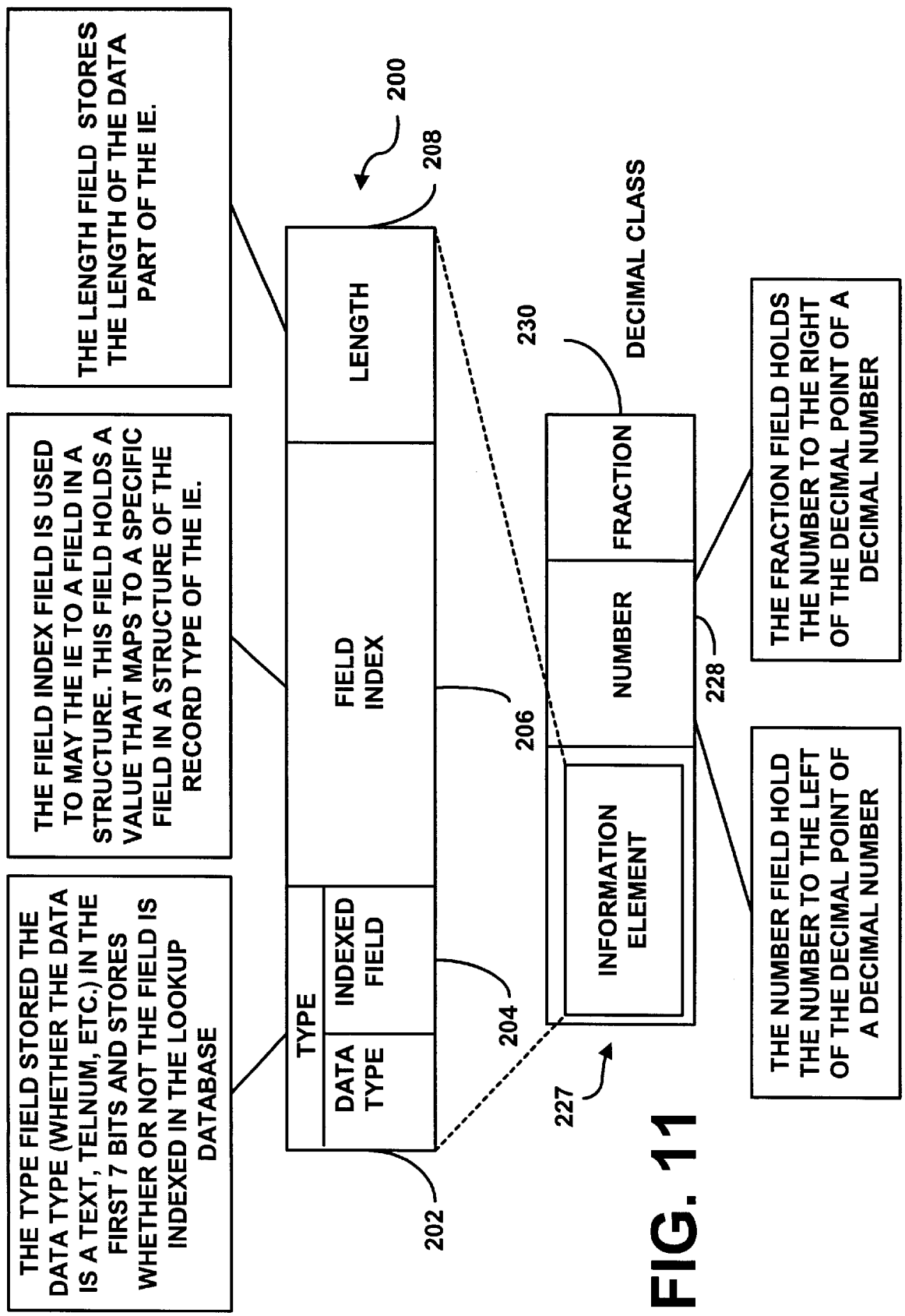
FIG. 11 is a diagram illustrating a decimal class information element utilized within the database system of the present invention.

Referring now to FIG. 11, the decimal class information element 227 is illustrated. The decimal class information element 227 includes IE 200, number field 228, and fraction field 230. The number field 228 holds the portion of a decimal number positioned on the left side of a decimal point. The fraction field 230 holds the portion of the decimal number positioned on the right side of the decimal point.

Figure 12:
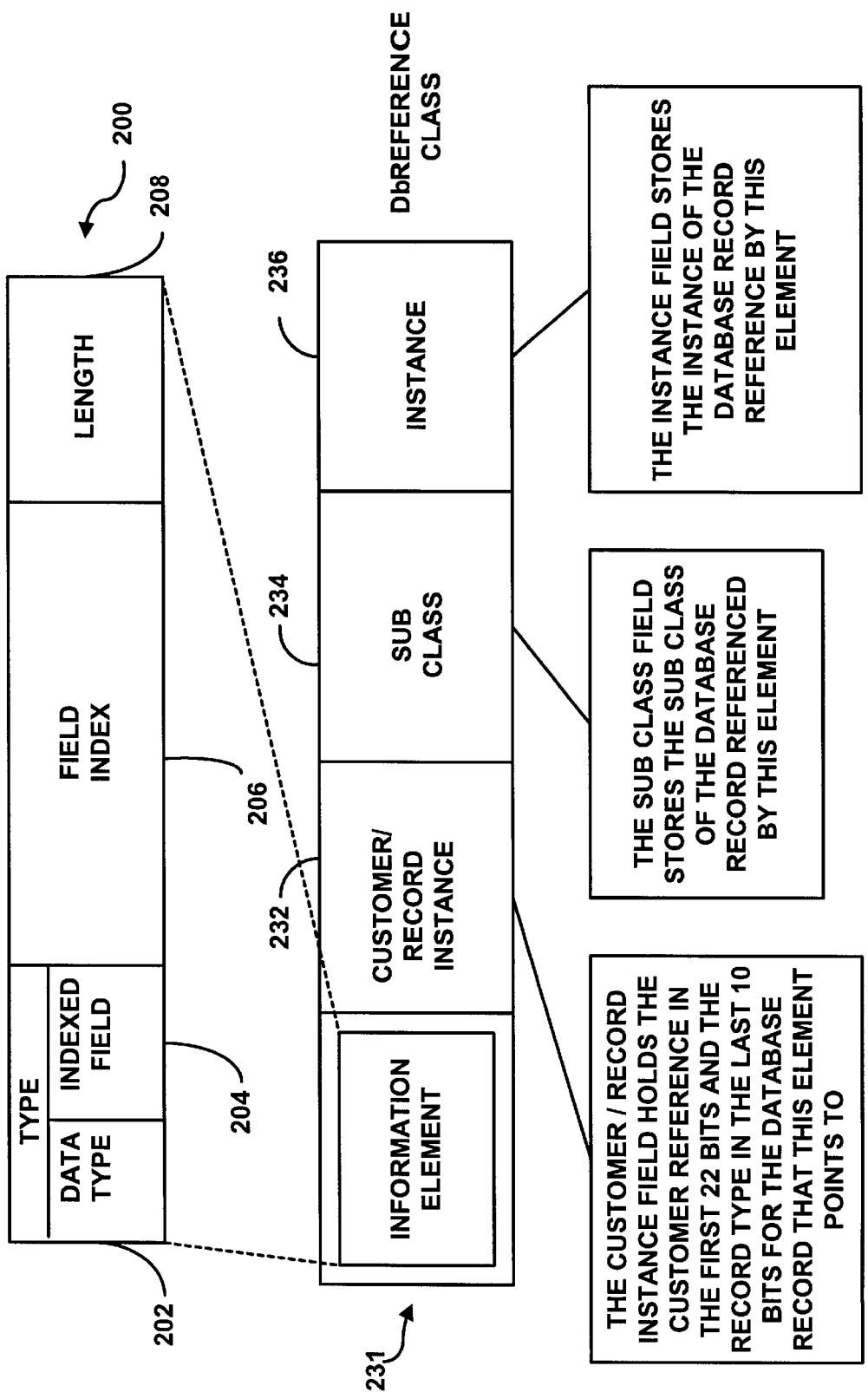
FIG. 12 is a diagram illustrating a data base cross reference information element utilized within the database system of the present invention.

Referring now to FIG. 12, a DB Reference Class information element 231 is illustrated. The DB Reference Class information element 231 includes IE 200, Customer/Record Instance field 232, Sub Class field 234, and Instance field 236. The Customer/Record Instance field 232 holds the customer reference in its first 22 bits and holds the record type in its last 10 bits. The record type corresponds to the database record pointed out by the DB Reference Class information element 231. The Sub Class field 234 stores the sub class of the database record referenced by the DB Reference Class information element 231. The Instance field 236 stores the instance of the database record referenced by the DB Reference Class information element 231.

Records: Sets of Information Elements

Each set of information elements is called record. Each record that is created is stored with identifying information about that record and a block of Information Elements that comprise the actual individual elements of the record. The record is also a C++class.

Db Record Class: The BASE Set of Information Elements

Figure 13:
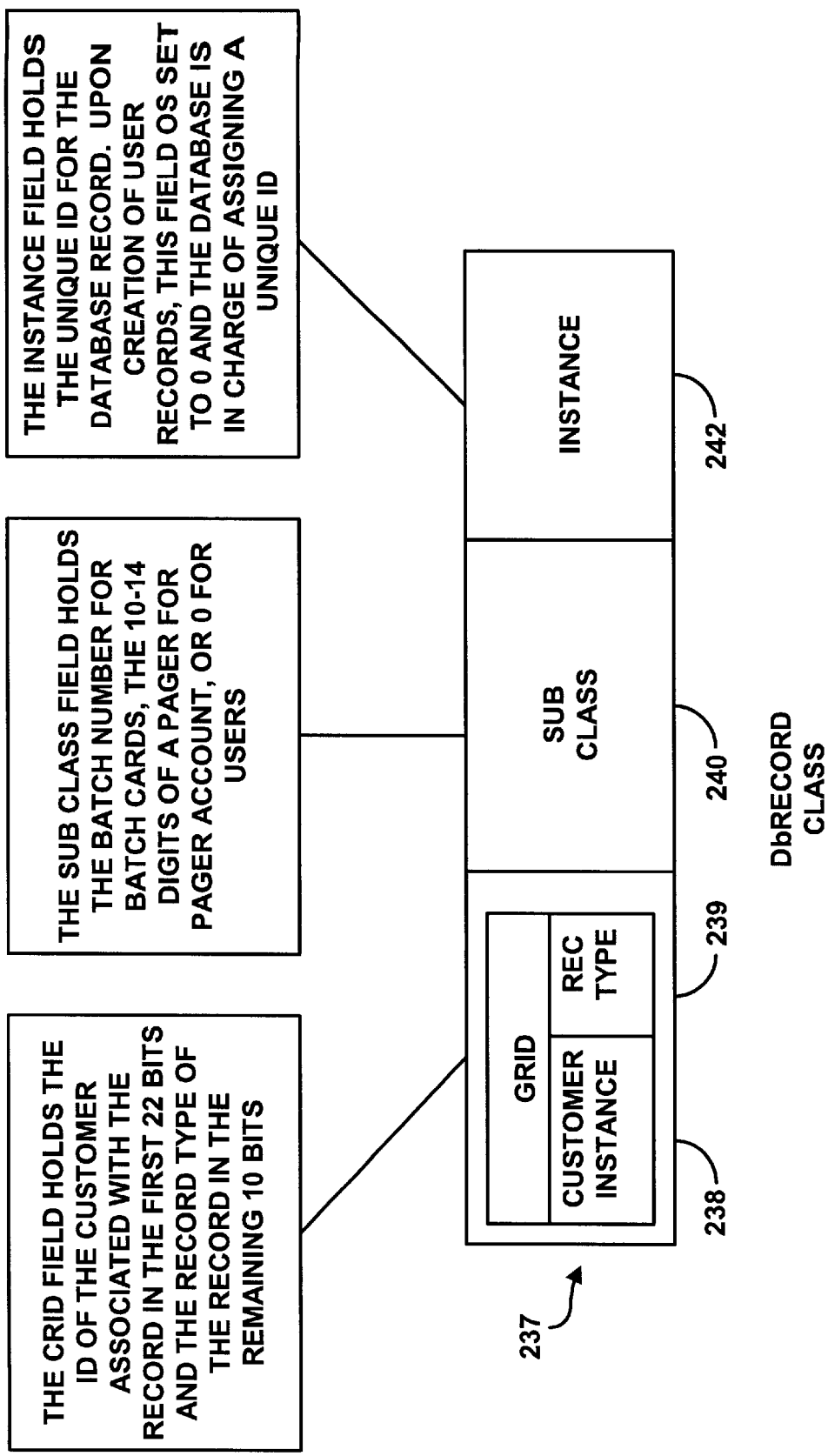
FIG. 13 is a diagram illustrating a DB record class utilized within the database system of the present invention.

Referring now to FIG. 13, the Db Record Class contains the customer instance 238 of the channel map associated with the record, the record type 239 of the record, the sub class 240, and the instance ID 242. This data comprises a unique address for a particular record. The channel map and record type are stored in the same long word; channel map is stored in the first 22 bits and the record type is in the remaining 10 bits. The sub class 240 is stored in its own long word; the sub class field is the higher order unique id for the record. This may be used to contain a grouping value if required, or as a simple extension of the addressable number. The instance field 242 has its own long word and holds the lower order unique ID for the database record. The combination of the above four fields makes a unique key across the entire network of IP's and SCP's.

Db DataRecord Class

Figure 14:
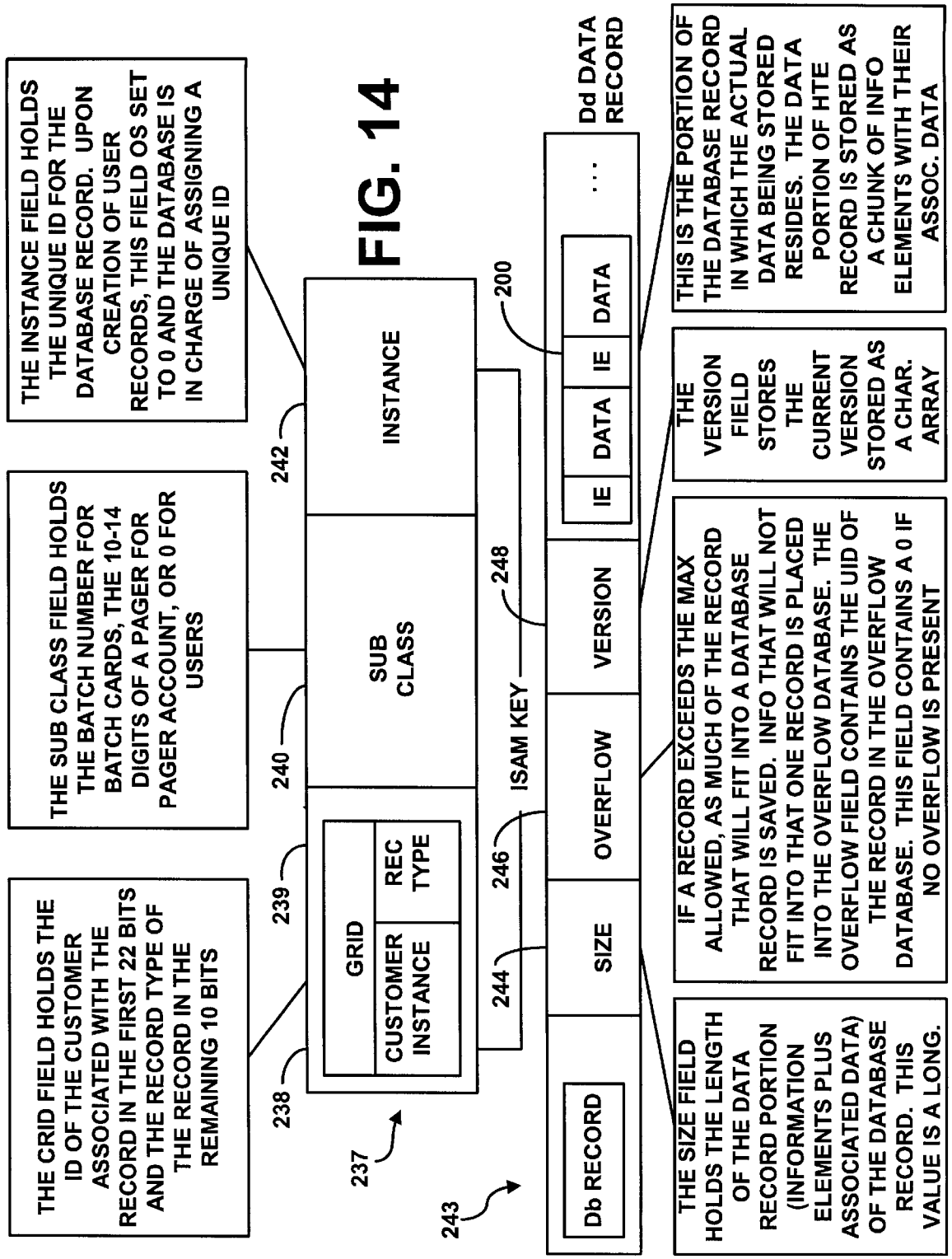
FIG. 14 is a diagram illustrating a DB data record class utilized within the database system of the present invention.

Referring now to FIG. 14, the Db DataRecord 243 is the base set of key data, along with a container for information elements 200 which are to be transacted. Besides the information inherited from the Db Record class 237 (which also serves as the unique key), the Db DataRecord class also contains the size of the record 244 (the size describes only the size of the actual data record), a continuation ID 246 (if this field is set to zero, no continuation exists for the current record, otherwise, the continuation ID 246 is used to chain additional data onto the base record), a version number 248, and the actual record data stored as a chunk of information elements 200 with their associated data.

Db Transaction Class

Figure 15:
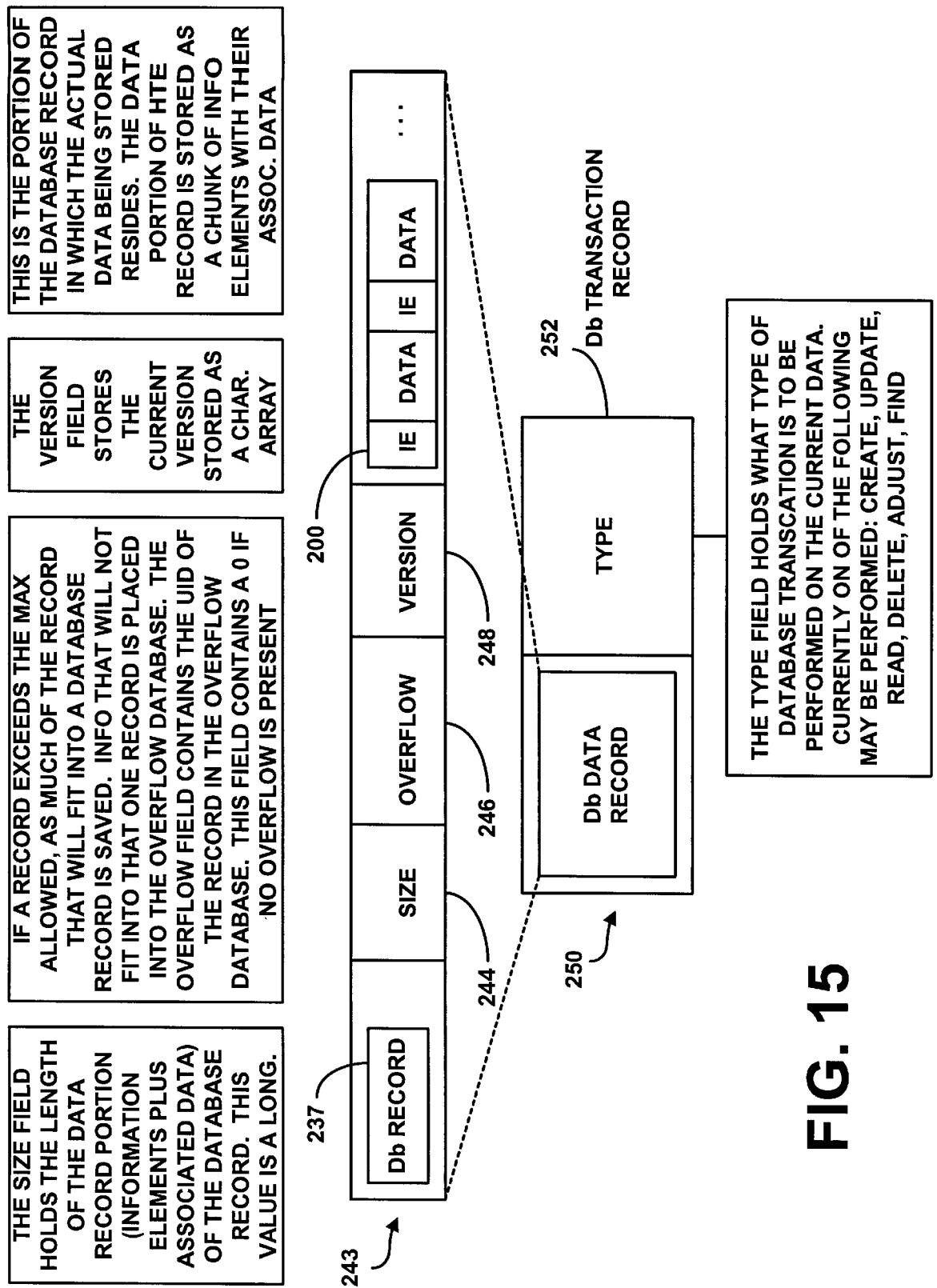
FIG. 15 is a diagram illustrating a DB transaction class utilized within the database system of the present invention.

Referring now to FIG. 15, the Db Transaction record 250 is the actual contents of transactions that are passed between clients and servers. The Db Transaction class inherits from the Db DataRecord class 243 and therefore has all of its members, as well as a flag 252 that describes what action is to be performed on the data contained in the Db DataRecord. Only the following actions may be performed on the data records: create, read, update, adjust, delete, and find.

Transactions

The Db Transaction class is the basis for all transactions performed by the database. A transaction is sent from the user/requesting process to the IP server. The transaction includes all of the data necessary to complete the transaction and a flag describing the action to be performed.

The Db Transaction class provides methods for requesting transactions as well as the methods to perform the appropriate action when a transaction is received by the database. The user/requesting process creates a transaction with the appropriate data and calls the methods corresponding to the desired action. The transaction reaches the appropriate SCP/Proxy daemon via the IP server where the transaction flag is consulted to call the proper method.

Six actions may be performed on the data:
1. CREATE: Writes a new record to the database.
2. READ: Reads an existing record from the database.
3. UPDATE: Updates fields in an existing record and modifies any search keys that have been modified.
4. ADJUST: Only available for fields that are of type Decimal; this allows the ability to add to or subtract from a decimal number.
5. DELETE: Deletes existing record from database and removes all search keys associated with record from lookup database.
6. FIND: Searches lookup database for records matching search key.

Requesting Transactions (Client Side)

Create Request

In order to send a create request to the database, a transaction must first be created. The transaction must be created with the appropriate channel map, record type, sub class, and instance if known. The database will assign an instance if the instance is unknown. After the transaction has been created, the individual elements of the record need to be added to the transaction. Adding the individual elements will set the size of the transaction properly. Once all of the data elements have been added, the proper method to send a create request to the database is invoked (CreateRecord( )). This method sets the flag to "create", creates the message to be sent, determines which database to send the request to (using the data channel map), sends the message off to that database, and waits for a reply from the database.

Read Request

A read request requires that a transaction be created with the elements of the unique key. These elements are the channel map/record type, sub class, and instance. Once the transaction is created with this information, the method to read from the database (ReadRecord( )) is invoked. This method sets the flag to "read", creates the message to send, determines which database to send the request to (using the data channel map), sends the message off to that database, and waits for a reply from the database. If the specified record was found in the database, that record is returned. It should be noted that a find transaction can be used to get a record when the elements of the unique key are not known.

Update Request

In order to update an existing record, a transaction must be created with the elements of the unique key (channel map/record type, sub class, and instance) that match the desired record. After the transaction is created, any fields to be modified or any new fields to be added must be added to the transaction. Once all of the desired data elements have been added, the method to update a record (UpdateRecord( )) is invoked. This method sets the flag to "update", creates the message to send, determines which database to send the request to (using the data channel map), sends the message off to that database, and waits for a reply from the database.

Adjust Request

To adjust an existing record, a transaction must be created with the elements of the unique key (channel map/record type, sub class, and instance) that match the desired record. After the transaction is created, any decimal fields to be adjusted must be added to the transaction. Once all of the desired data elements have been added, the method to adjust a record (AdjustRecord( )) is invoked. This method sets the flag to "adjust", creates the message to be sent, determines which database to send the request to (using the data channel map), sends the message off to that database, and waits for a reply from the database.

Delete Request

A delete request requires that a transaction be created with the elements of the unique key (channel map/record type, sub class, and instance). Once the transaction is created with that information the method to delete from the database (DeleteRecord( )) is invoked. This method sets the flag to "delete", creates the message to send, determines which database to send the request to (using the data channel map), sends the message off to that database, and waits for a reply from the database.

Find Request

A find request requires that a transaction be created with a channel map id. Thus a find is limited to a known database channel. To search for a record on all databases, the client has to perform a find for each channel, and combine the results. Once the transaction is created, a fundamental element matching the desired field to search on (i.e., a user's first name, last name, or phone number) must be created and added to the transaction. Once the element is added, the method to find a record in the database (FindRecord( )) is invoked with a search type (Partial or Exact), a pointer to an array of n Db Records (n equals the maximum number of matches allowed for the find request), the maximum number of matches allowed to be returned for this find, and a pointer to a long in which to store the last record read from the database. This method sets the flag to "find", creates the message to send, determines which database to send the request to (using the data channel map), sends the message off to that database, and waits for a reply from the database. If the find request was successful (at least one match was found), the last record pointer is set to the last record read, the matching Db Record(s) found is(are) copied into the pointer allocated to hold the matching records, and the number of matches is returned.

Receiving Transactions (Data Channel Manager Side)

The data channel manager receives the transactions, and then based upon the protocol between the SCP/Proxy and the DCM, encodes the data for transmission. Before the data is sent, it is queued upon a list for retransmission upon failure. Additionally, the service state of the channel is checked to determine if the transaction should proceed. If the channel is down, the transaction is returned to the sender with a return code which indicates that the database server is down.

Receiving Transactions (SCP/Proxy Side)

Create Request

When a create request comes into the SCP/Proxy, the record is removed from the transaction. If the record's size exceeds that of the maximum record size allowed for the physical database, a record that fits into the size allowed is created and the remaining data is stored as one or more records in the overflow database. The management of any database relations or index keys is performed as required.

Read Request

When a read request comes into the SCP/Proxy, the record matching the specified keys is read from the database using tools specific to the database. For instance, if the database is an SQL database, SQL queries are transacted with the database. If the read is successful, a check is made to see if overflow exists for that record. If overflow exists, the overflow is read from the overflow database and added to the record already read from the main database.

Update Request

When an update request comes into the SCP/Proxy, the existing record is read from the database (including any overflow if present). The elements of the existing record are compared to those elements of the new record. If an element in the new record matches that of one in the existing record, the contents of the old record are replaced with the contents of the new record. Any elements in the new record that were not in the existing record are added. The record is then saved adding any new overflow as necessary.

Adjust Request

When an adjust request comes into the SCP/Proxy, the existing record is read from the database (including any overflow if present). The elements of the existing record are compared to those elements of the new record. If an element in the new record matches that of one in the existing record, the contents of the new record are added to the contents of the old record. (The adjust request is only allowed on elements of type Decimal.) The record is then saved.

Delete Request

When a delete request is received by the SCP/Proxy, the existing record is read from the database (including any overflow if present). All index maintenance that is required must be maintained for the IE's contained within the record. Any overflow associated with the record is removed from the database. Finally, the data record is removed from the main database.

Find Request

When a find request is received by the SCP/Proxy, a query appropriate for the database being used is constructed from the IE's contained in the transaction. If a match exists and the maximum number of matches allowed for this search has not been exceeded, the database record I.D. associated with the lookup record is added to the list of matching records, and the number of matches count is incremented. Once no more matches can be found in the lookup database or the maximum number of matches has been reached, that information is returned to the requesting process. The process thus receives a list of matching unique I.D.'s.

XCP: External Channel Protocol

External Channel Protocol (XCP) is a simple session layer protocol built on top of the Transmission Control Protocol (TCP) that is used to transport Database Transaction Requests (DTR's) and their responses between for example an IP server, a Data Channel Manager (DCM), and the proxy server (PROXY), which is a remote interface, typically to an SQL database. Each DCM/PROXY pair has only a single connection between them on which XCP packets are transported. DTR's are sent as the data part of an XCP packet, where an XCP packet is made up of two parts: the XCP header and its data (DTR). In general, a DTR will just be a Db Transaction object supplied by the initiating client process, and DCM just wraps this in an XCP packet and forwards it on to PROXY.

Figure 18:
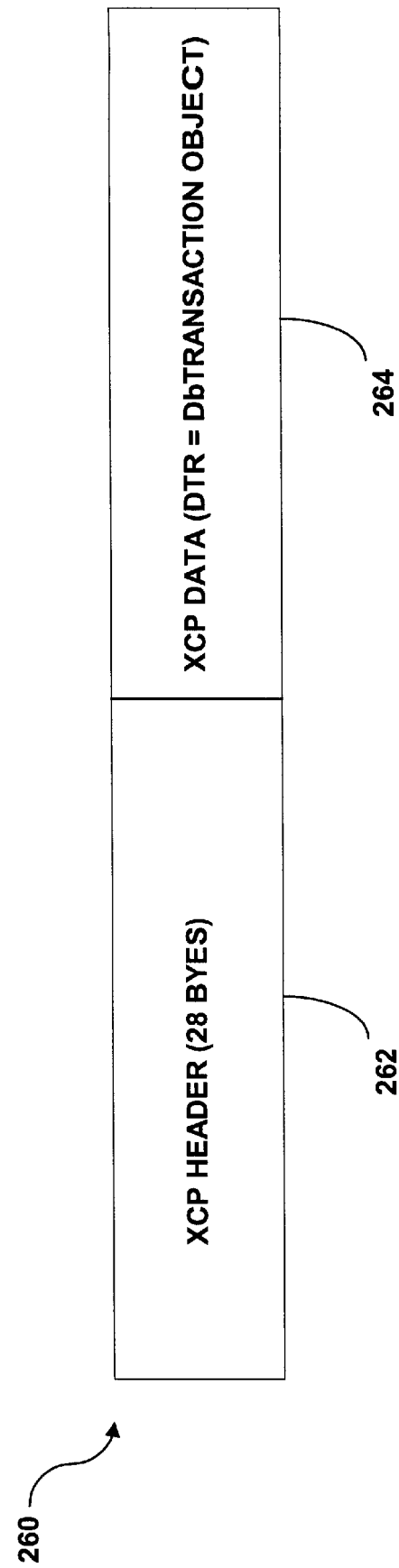
FIG. 18 is a diagram illustrating an XCP packet of the present invention.
Figure 19:
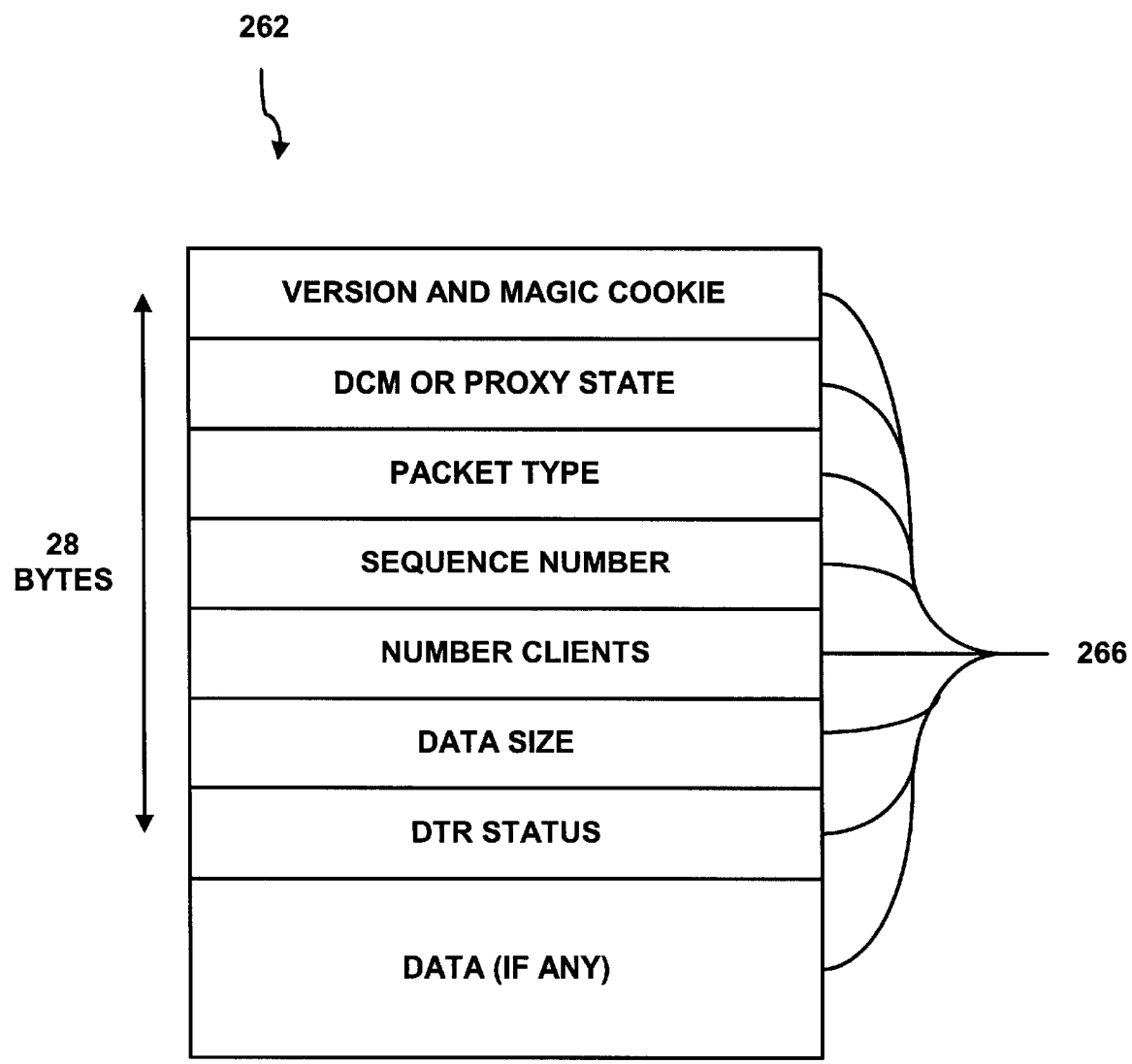
FIG. 19 is a diagram illustrating the fields in the XCP header of the present invention.

Referring to FIG. 18, a representative XCP packet 260 is illustrated. The XCP packet 260 contains an XCP header 262 and XCP data 264. Referring now to FIG. 19, the fields 266 in the XCP header 262 are illustrated. The normal size of the XCP header 262 is 28 bytes (seven fields of four bytes each).

The version/magic cookie contains the XCP magic-cookie (0xdeadd0d0) xor'd with the version of the XCP protocol being used (the current protocol version is 1). Each packet received by either DCM or PROXY is checked using this field for synchronization problems. If the packet's field does not coincide with what is expected, the current connection is closed and a new one is opened. Packets sent between servers using different versions will cause the connection to be closed, as this will be seen as a synchronization problem.

The DCM/PROXY state contains the state of either the DCM for packets sent to the PROXY, or the state of the PROXY for packets sent to the DCM. Referring now to FIG. 20, the valid XCP server states 268 understood by XCP server are illustrated.

Referring now to FIG. 21, the valid XCP packet types 270 are listed. The packet type indicates the nature of the packet sent/received. Certain packet types may be ignored by a given server depending on the sending server's state; conversely, some may be applicable only if the servers are in a specific state. Also, the state of PROXY can determine whether or not DCM should send any new DTR's to it. Thus, the state field, along with the client field are used to implement rudimentary flow control of packets between DCM and PROXY.

The sequence number is used for identification purposes. When DCM sends a DTR to PROXY, it queues the request waiting for the response. Since there may be multiple outstanding DTR's, and the order that they are responded to by PROXY is unknown, the sequence number is used to identify and match responses to their original requests. This is a necessary matching process since it is the original request that contains the information about the client that initiated the DTR. The choice of the label "sequence number" is a bit of a misnomer since DTR's are not related to each other and no guarantees can be made about their order of execution by PROXY. The sequence number field should only be thought of as an identification code for matching requests with their responses. This field is also used to avoid having PROXY execute the same DTR twice. Since DCM will retransmit a packet if it times out, PROXY uses this field to see if it is already currently processing the given DTR. If it is, it ignores the duplicate packet and associated DTR.

The number clients field contains the number of outstanding unacknowledged DTR's that PROXY is willing to handle. It represents the number of packets that DCM can send to PROXY that haven't been responded to yet. This value is negotiated by DCM and PROXY during the binding phase of connection establishment. PROXY may also change this value in order to achieve some flow control as it sees fit. (This is usually based on the number of clients an associated SQL database can handle, or on the average response time to handle a DTR.)

The data size is the number of bytes of data in the packet. Data size does not include the size of the packet header itself, so the total length of the packet is the header size (28 bytes) plus the value of the size field. The value of this field can be 0 bytes, which would indicate a packet with no data (i.e., just a header), as is the case, for example, with a PING packet. The DTR status indicates the success or failure of the database access/query. This value then gets passed on by DCM to the initiating client of the transaction. The status of all packets from DCM to PROXY is unspecified since it has no meaning in this context. The status is only valid for packet types of XCP_RSQT_RSP. Referring to FIG. 22, the valid XCP statuses 272 included with version 1 of XCP are listed.

Establishing an XCP Connection

Figure 23:
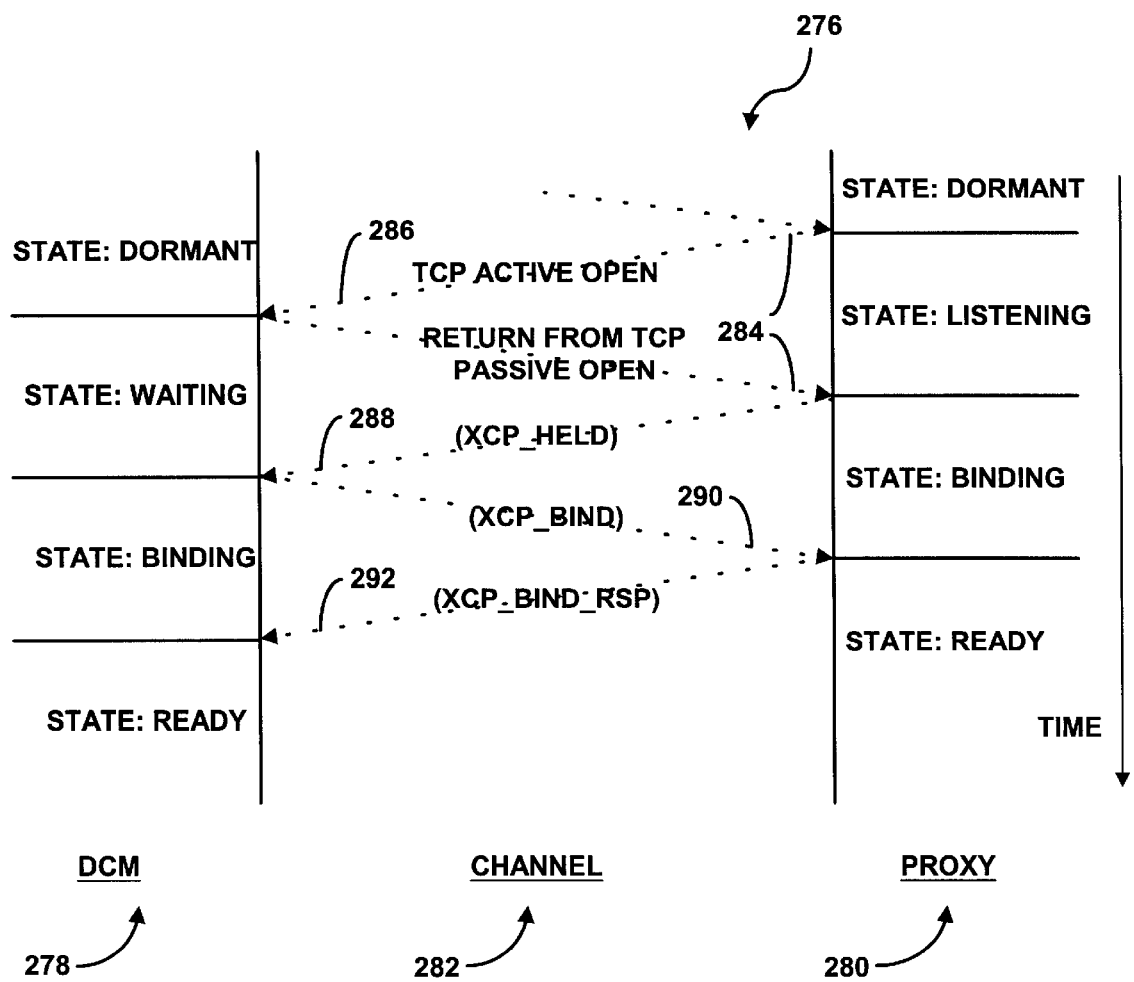
FIG. 23 is a diagram illustrating XCP protocol of the present invention.

Referring now to FIG. 23, the XCP protocol 276 to establish a connection between DCM 278 and PROXY 280 can be shown as a series of exchanged packets 282 between servers and the states of DCM 278 and PROXY 280.

PROXY 280 executes a passive open 284 on a TCP port (for example, in BSD sockets this would involve a call of the accepts function) and acts as the server of the DCM/PROXY pair. DCM 278, on the other hand, acts as the requesting end or client of the pair and issues an active open 286 (again, in BSD style sockets this would be a call to the connect( ) function).

The active open 286 executed by DCM 278 is non-blocking and returns immediately before the TCP/IP connection has necessarily been established. So in order to know that the TCP/IP connection is up, DCM 278 waits for PROXY 280 to send the XCP_HELO packet 288. The purpose of this packet is simply to let DCM 278 know that it can now write to the connection without any errors occurring. After DCM 278 has received and validated the XCP_HELO packet 288, both DCM 278 and PROXY 280 should be in the BINDING state.

After receiving the XCP_HELO packet 288, DCM 278 sends to PROXY 280 an XCP_BIND packet 290. The packet 290 contains as one of the XCP header fields the number of clients that DCM 278 is expecting PROXY 280 to handle. PROXY 280 receives the XCP_BIND packet 290, and based on the maximum number of clients that it can handle and the requested number of clients by DCM 278 as indicated by the packet 290, PROXY 280 decides on the maximum allowed clients for this connection. It returns this value in the XCP_BIND_RSP packet 292 that it sends back to DCM 278. DCM 278 reads that clients value from the bind response packet 292 and adjusts its clients value accordingly. As this protocol suggests, PROXY 280 has the final say on the end number of clients supported by a given connection between DCM 278 and PROXY 280. After the binding step, both processes should be in the READY state.

There are several instances when a connection cannot be established; for example, if the bind packets are corrupted, PROXY 280 is down, or PROXY 280 and DCM 278 are using different versions of XCP. To prevent DCM 278 from endlessly waiting, XCP limits the number of tries that DCM 278 makes to establish a successful connection. After each active open, if no XCP_HELO packet has been sent by PROXY 280, DCM 278 waits for nine seconds before timing out. DCM 278 will try to re-connect a total of seven times for a total of 63 seconds total elapsed time before DCM 278 assumes that the connection is permanently down. These values were chosen to give PROXY 280 enough time to redo its TCP passive open after an error. Since the port could be left in a TIME_WAIT state after an unexpected close, and TIME_WAIT states can last up to 60 seconds, DCM 278 must wait at least a TIME_WAIT amount of time. DCM 278 can also time-out (after the same nine-second wait) if the bind response takes too long, in which case the process is started over from the top, but with one less connection retry available. It should be noted that after a successful connection has been established and both DCM 278 and PROXY 280 are in the READY state, the connection retry count is reset to seven, such that if the connection is dropped or needs to be re-synchronized, a full slate of attempts will be made.

The number-of-clients protocol is as follows. If DCM 278 doesn't care how many outstanding unacknowledged requests PROXY 280 is processing, then it sends a zero in the XCP header clients field. PROXY 280 can then set the number of unacknowledged requests to whatever it wants. If DCM 278 sends a positive number in the bind packet, the positive number is taken to be the maximum number of unacknowledged requests that the DCM 278 wants outstanding at any given time, and so the PROXY 280 is free to choose a value based on its own capacities, that is, between one and the maximum number. The chosen value is sent back to DCM 278 in the response packet. DCM 278 accepts the bind response client value as the final value and adjusts its parameters accordingly. It should be noted that by this point PROXY 280 has adjusted the value for the number of clients to whatever the final value will be, so DCM 278 just needs to record the value for future use.

Timers

XCP uses four different logical timers to maintain its connection between DCM and PROXY. These are described below in the approximate order of their occurrence during the lifetime of a connection. All four timers are used by DCM and have nothing to do with PROXY. DCM is the more active process in establishing the connection, whereas PROXY tends to the passive end of things, hence DCM is in charge of deciding whether or not the connection attempt was successful.

1. A connection-establishment timer starts when the connection port is opened by DCM ,i.e., when the Serial_Open( ) function is called or when a XCP_BIND packet is sent again by DCM. If a response (e.g., an XCP_HELO or XCP_BIND_RSP packet respectively) is not received within a specified time (nine seconds), the connection establishment is aborted and restarted. The connection attempt is only restarted a total of seven times before the connection attempt fails completely.

2. A expiration timer is set every time a new DTR is received by DCM. It is used to time-out a DTR if it is taking too long to access a database, or if it has been waiting too long on one of the queues maintained by DCM. This timer is set to 50 seconds.

3. A retransmission timer is set when DCM sends a packet to PROXY. If a response is not received before the timer expires, the packet is resent. The value of this timer (i.e., the amount of time DCM waits for a response) is calculated dynamically, based on the round-trip times measured by DCM for previous XCP packets. The value for this timer is bounded by XCP to be between 0.5 and 15 seconds.

4. A ping timer is set every time a packet is received by DCM from PROXY. Upon its expiration a XCP_PING packet is sent to PROXY to check the state of the connection and to check and update the clients parameter of PROXY. If another packet is received from PROXY before the ping timer has expired, the ping timer is reset. Thus, ping packets are only transmitted when no other activity is present on the connection. The value for the ping timer is 25 seconds: if a connection has been inactive for longer than 25 seconds, DCM will start pinging PROXY to check for an active connection.

Part of the purpose of DCM pinging PROXY is when PROXY advertises the number of clients as zero, a packet of some sort needs to be sent and received; otherwise, DCM will never get an update of the clients parameter to a non-zero value, and will never be able to start sending new DTR's to PROXY. Thus, DCM pings PROXY to see if PROXY has started to accept DTR's for processing. Following similar logic, since all packets contain the same information in their headers, XCP avoids redundant packet traffic by not pinging PROXY when that information is already available from other packets—namely XCP_RQST_RSP packets.

As mentioned above, the value of the retransmission timer (RTO) is calculated dynamically by measuring the round-trip time (MRTT) of previously successful packet transmissions and keeping track of the smoothed round-trip time (SRTT) estimator and a smoothed mean deviation estimator (VRTT). The following equations are used to update these estimators and to calculate a value for RTO:

$$DELTA = MRTT - SRTT$$

$$SRTT = SRTT + 0.125 * DELTA$$

$$VRTT = VRTT + 0.25 * (|DELTA| - VRTT)$$

$$RTO = SRTT + 4 * VRTT$$

It should be noted that the equations are partially taken from Stevens and Wright's *TCP/IP Illustrated* Volume 2. DELTA is the difference between the measured round-trip just obtained (MRTT) and the current smoothed round-trip time estimator (SRTT). A variation of Jacobson's algorithm is used in DCM. Since XCP is a session layer protocol based on the reliable TCP transport layer, no exponential back-off is used for retransmission. Because it is known that the packet was received by PROXY, but that PROXY either lost it or its execution is taking longer than expected, the current value for RTO is used for all retransmissions. In any case, when a response is received for a packet that was retransmitted, the MRTT for that packet is not used to update the estimators due to the retransmission ambiguity problem. DCM uses fixed-point integers to maintain the two smoothed estimators SRTT and VRTT. The fixed-point integers avoid floating-point calculations in the code.

DCM Server Design

Figure 25:
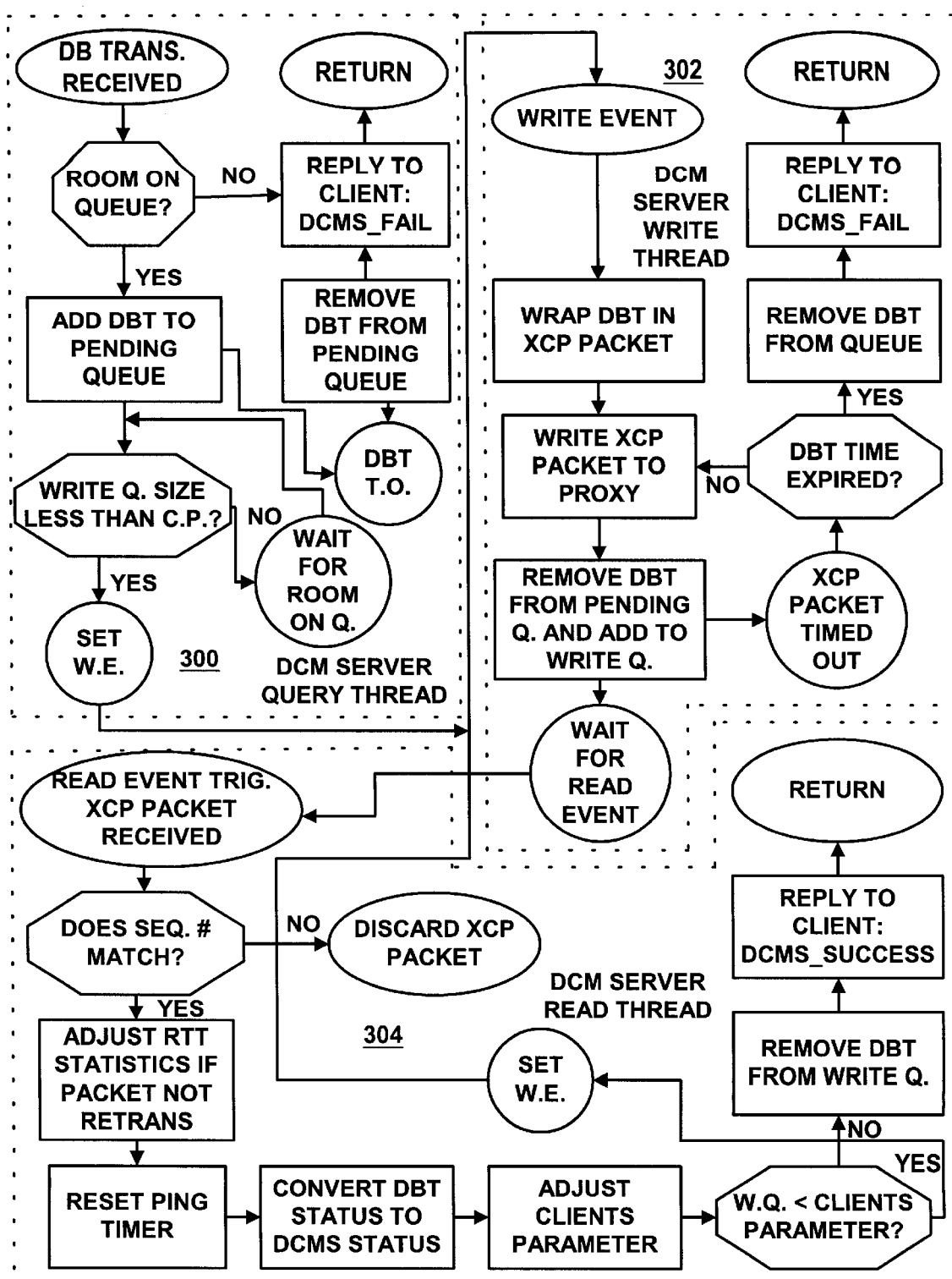
FIG. 25 is a flow chart illustrating the major functions carried out by various DCM server threads of the present invention.

The DCM server is a multi-threaded concurrent design. Referring to FIG. 25, a software flow chart illustrating the major functions carried out by the various threads and the threads interaction with each other is shown. The DCM server has three main threads that communicate through the use of two shared data structures. The three main threads are the query thread 300, the write thread 302, and the read thread 304. Implied in the flow chart are two queues that are used to pass Db Transactions (DTRs) between the different threads of execution. One queue being the pending queue where a DTR resides until it gets written to PROXY. The other queue being the written queue where a DTR waits until it gets acknowledged/responded to by PROXY.

1. The query thread 300 accepts DTRs from client processes where each Db Transaction represents a database query. The query thread 300 checks for overflow conditions. For example, more than 100 pending DTRs on the pending queue. If there is an overflow condition, such as too many DTRs in the system, DCM immediately returns a failed status. Otherwise, if the system is not overloaded, the query thread 300 adds the DTR to the pending queue for the write thread 302 to pick up and write to PROXY.

2. The write thread 302 checks to see if the associated PROXY does not have its allotted amount of outstanding DTRs already transmitted to it. This is based on the clients parameter that was negotiated during the connection establishment phase previously described above. If PROXY is able to accept an additional DTR, the write thread 302 wraps the DTR in an XCP packet, filling the XCP header fields appropriately. The write thread 302 then transmits the XCP packet containing the DTR to PROXY for execution.

3. The read thread 304 checks to see if any responses have been returned by PROXY on the connection. If so, the read thread 304 matches up the returned DTR with those on the written queue based on the DTR's sequence number. If the DTR's sequence number doesn't match any of those on the written queue, the DTR is discarded. Typically, this only happens if the DTR on the written queue had previously timed-out and had been removed. Otherwise, some system parameters must be adjusted (e.g., the round-trip time estimators, the ping time-out value, and the clients parameter) and a status of DCMS_SUCCESS must be returned to the client process. (This is only if the XCP packet status indicated a success; FIG. 25 only shows what happens in the expected case and does not show all the error cases.) If there are any DTRs on the pending queue waiting to be written and the written queue has room for them, the write thread 302 must be set to fire so it can transmit them to PROXY.

Note that the size of the written queue and hence the number of DTRs transmitted to PROXY without a response is equal to the clients parameter that is included in every XCP packet header. If PROXY alters this parameter to a value lower than the written queue and write thread 302 are currently using, no more DTRs will be moved to the written queue from the pending queue by the write thread 302 until enough responses are received from PROXY to bring the size of the written queue down to a level consistent with the new clients parameter. This is how a basic level of flow control is implemented between DCM and PROXY.

In addition to the above described functions, the query and write threads 300 and 302 also handle time-outs on the DTRs. The total amount of time that a DTR can be in the DCM-PROXY system is limited to a total of 50 seconds. If the DTR resides on the pending queue for longer than this, it times out and the query thread returns a DCMS_TIMED_OUT status to the initiating client process.

The written queue keeps track of two time-out values for a given DTR. Preferably, a DTR can only reside on the written queue for a total time equal to the 50 seconds discussed above, minus the time the DTR spends on the pending queue. Again, if the DTR reaches this time, it is returned to the initiating client with a DCMS_TIMED_OUT status. Note that the DCMS_TIMED_OUT status is given the generic DCMS_FAIL status in the flow chart. The written queue also has a retransmission time-out value which, if it fires, causes the write thread 302 to rewrite the DTR to PROXY. This retransmission time-out value is always less than the value remaining on the system-wide time-out.

SCP/PROXY Server Design

Figure 26:
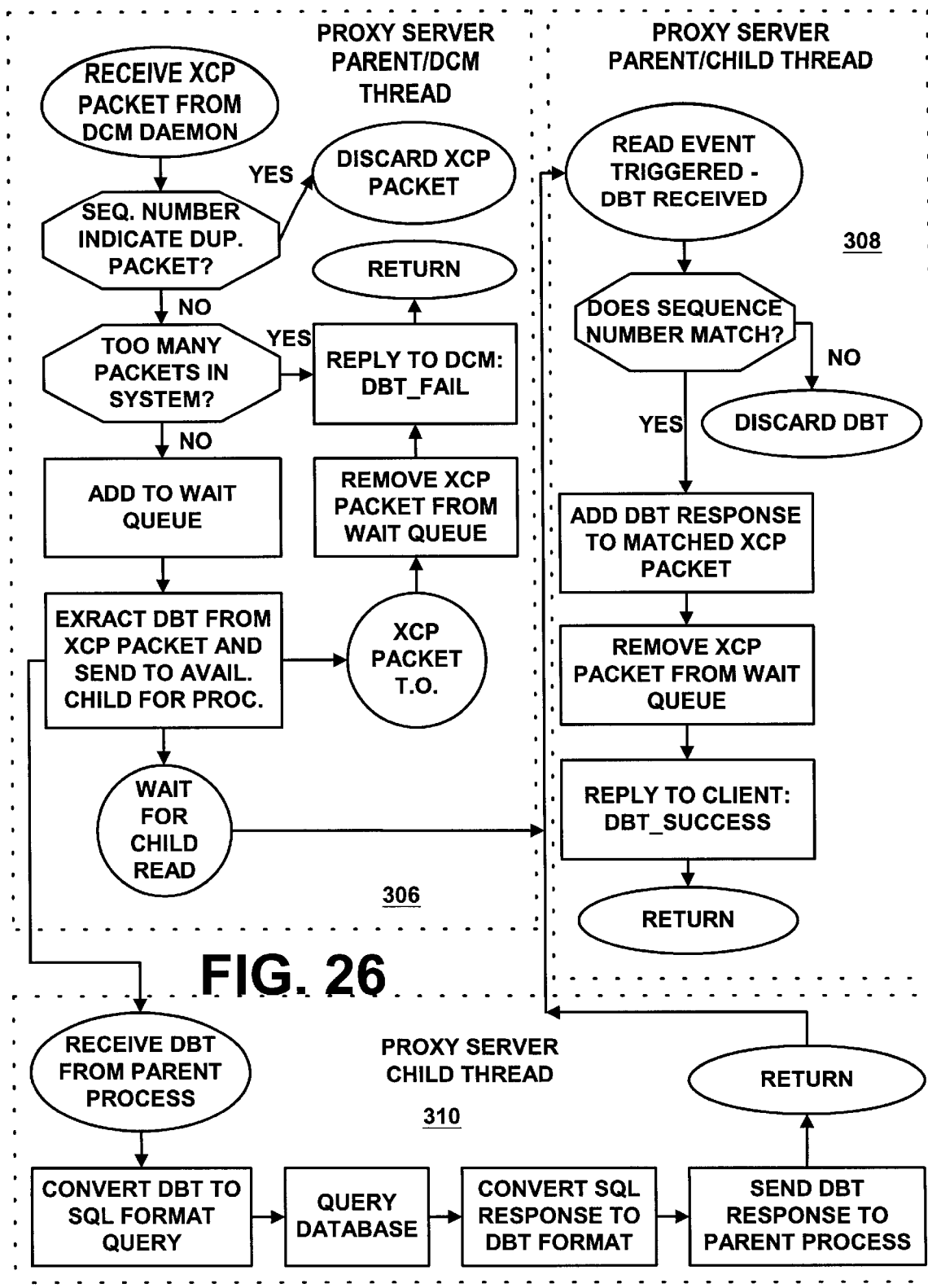
FIG. 26 is a flow chart illustrating the major functions carried out by various PROXY server threads of the present invention.

The PROXY server also has a multi-threaded concurrent design that communicates through the use of one shared data structure. Referring now to FIG. 26, the three main types of threads of the PROXY server are shown. The three threads are parent/DCM thread 306, parent/child thread 308, and child thread 310.

Unlike the DCM server design described above, which has only one copy of each type of thread active at a given time, the PROXY design has two logical threads 306 and 308 that have only one instance of themselves active, and one thread 310 (the child thread) that has multiple copies active at any given time. The number of copies active should be equal to the clients parameter that is passed between DCM and PROXY in the XCP packet header.

The parent/DCM thread 306 polls the DCM/PROXY connection to see if there are any incoming XCP packets that need processing. The parent/DCM thread 306 reads an XCP packet from the connection and checks for overflow conditions and whether or not the packet received is a duplicate of a previously sent packet. It should be noted that the DCM controls the number of packets sent based on the clients parameter, so a serious error has occurred if a packet received by the parent/DCM thread 306 causes an overflow. Otherwise, if there is an available child thread 310 to process the database transaction, the packet is added to the wait queue and handed off to the child thread 310 for processing.

The parent/child thread 308 polls the child thread 310 for the returned response from processing a Db Transaction. The parent/child thread 308 uses the sequence number to match the response with the XCP packet on the wait queue. If the XCP packet has already timed-out, the sequence number will not match any of the waiting XCP packets, and it will be discarded. If a match is found, the PROXY-received XCP packet has its DTR query replaced by the DTR response returned by the child process, and the new XCP packet is returned to DCM.

The child thread 310 represents the multiple copies of the database clients that do the actual interfacing with the given SQL database. The child thread 310 reads DTRs from the parent/DCM thread 306, converts each DTR into a SQL format query, and queries the database. The SQL response is then converted back to a DTR style format, and the DTR sent to the parent/child thread 308.

In addition to the above described functions, the parent/DCM thread 306 also handles time-outs on the received Db Transactions. The total amount of time that a DTR can be in the PROXY system is limited to a total of 45 seconds. If the DTR resides on the wait queue for longer than this, it times-out and the thread returns the XCP packet with a DBT_TIMED_OUT status to DCM.

XCP Statistics

Referring now to FIG. 24, various XCP statistics (dcmstats MEMBER) 274 maintained by DCM in a global structure dcmstats are illustrated. DCM increments these counters at various stages in its execution. These statistics are available through the use of the utils tests dcmstats <channel> command available as part of the IP server/DCM suite. The current Smoothed Round-Trip Time (SRTT) and the variance in SRTT are also maintained by DCM for the round-trip time of a DTR as perceived by the initiating client process, and for the round-trip time of an XCP packet sent and received between DCM and PROXY. The difference between the two is the second one does not include the waiting time that a DTR might encounter before it is transmitted to PROXY for execution. Two different SRTT statistics are kept because the first is a more meaningful measure of the response time as seen by a client process, while the second is used to calculate the value used for time-out and retransmission of an XCP packet to the PROXY from DCM. Again, these variables are accessible by the utils test programs.

A general description of the apparatus and method of the present invention as well as preferred embodiments of both has been set forth above. One skilled in the art will recognize and be able to practice many changes in many aspects of the apparatus and method described above, including variations which fall within the teachings of this invention.

What is claimed is:

1. A database system comprising:
   at least one intelligent peripheral device;
   at least one database connected to said at least one intelligent peripheral device through a communications medium;
   a default database connected to said at least one intelligent peripheral device through said communications medium, said default database containing configuration data about said at least one database;
   said at least one intelligent peripheral device accessing data stored in said at least one database by acquiring said configuration data from said default database and communicating with said at least one database in accordance with said configuration data; and
   said at least one intelligent peripheral device accessing data stored in said at least one database based on a database map derived from said configuration data and a data request received by said at least one intelligent peripheral device.

2. The database system of claim 1 wherein said at least one intelligent peripheral device is a computer system.

3. The database system of claim 1 wherein said at least one intelligent peripheral device is a telecommunications switch.

4. The database system of claim 1 wherein said at least one intelligent peripheral device stores said database map in a cache memory.

5. The database system of claim 1 wherein said database map is derived from said configuration data and a DNIS of a call that generated said data request.

6. The database system of claim 1 wherein said database map is derived from said configuration data and a OCN/Redirect of a call that generated said data request.

7. The database system of claim 1 wherein said database map is derived from said configuration data and a ANI of a call that generated said data request.

8. The database system of claim 1 wherein said database map is derived from said configuration data and an address inputted by a caller that initiated said data request.

9. The database system of claim 1 wherein said at least one database is a first database and a second database, said first database having a different access protocol than said second database.

10. The database system of claim 1 wherein said at least one intelligent peripheral device combines default data with data that is retrieved from at least one accessed database such that said default data replaces any missing data fields in said retrieved data.

11. The database system of claim 10 wherein said default data is contained in the configuration data acquired by said at least one intelligent peripheral device.

12. A database system comprising:

at least one intelligent peripheral device;

a plurality of databases connected to said at least one intelligent peripheral device through a communications medium;

a default database connected to said at least one intelligent peripheral device through said communications medium, said default database containing configuration data about said plurality of databases;

said at least one intelligent peripheral device accessing data stored in said at least one of said plurality of databases by acquiring said configuration data from said default database and communicating with at least one of said plurality of databases in accordance with said configuration data; and said at least one intelligent peripheral device accesses data stored in said at least one of said plurality of databases based on a database map derived from said configuration data and a data request received by said at least one intelligent peripheral device.

13. The database system of claim 12 wherein said at least one intelligent peripheral device is a computer system.

14. The database system of claim 12 wherein said at least one intelligent peripheral device is a telecommunications switch.

15. The database system of claim 13 wherein said at least one intelligent peripheral device stores said database map in a cache memory.

16. The database system of claim 13 wherein said database map is derived from said configuration data and a DNIS of a call that generated said data request.

17. The database system of claim 13 wherein said database map is derived from said configuration data and a OCN/Redirect of a call that generated said data request.

18. The database system of claim 13 wherein said database map is derived from said configuration data and a ANI of a call that generated said data request.

19. The database system of claim 13 wherein said database map is derived from said configuration data and an address inputted by a caller that initiated said data request.

20. The database system of claim 12 wherein said plurality of databases includes at least two databases having different accessing protocol.

21. The database system of claim 12 wherein said at least one intelligent peripheral device combines default data with data that is retrieved from at least one accessed database of said plurality of databases such that said default data replaces any missing data fields in said retrieved data.

22. The database system of claim 21 wherein said default data is contained in the configuration data acquired by said at least one intelligent peripheral device.

23. A channelized database system comprising:

at least one intelligent peripheral device;

a plurality of communication channels connected to said at least one intelligent peripheral device, each communication channel associated with a database;

a memory element connected to said at least one intelligent peripheral device for providing configuration data about said plurality of communication channels to said at least one intelligent peripheral device such that said at least one intelligent peripheral device can locate and access data stored in at least one database associated with said at least one of said plurality of communication channels; and said at least one intelligent peripheral device accesses data stored in said at least one database based on a channel map derived from said configuration data and a data request received by said at least one intelligent peripheral device.

24. The database system of claim 23 wherein said at least one intelligent peripheral device is a computer system.

25. The database system of claim 23 wherein said at least one intelligent peripheral device is a telecommunications switch.

26. The database system of claim 25 wherein said at least one intelligent peripheral device stores said channel map in a cache memory.

27. The database system of claim 25 wherein said database map is derived from said configuration data and a DNIS of a call that generated said data request.

28. The database system of claim 25 wherein said database map is derived from said configuration data and a OCN/Redirect of a call that generated said data request.

29. The database system of claim 25 wherein said database map is derived from said configuration data and a ANI of a call that generated said data request.

30. The database system of claim 25 wherein said database map is derived from said configuration data and an address inputted by a caller that initiated said data request.

31. The database system of claim 23 wherein said at least one database is a first database and a second database, said first database having a different access protocol than said second database.

32. The database system of claim 23 wherein said at least one intelligent peripheral device combines default data with data that is retrieved from at least one accessed database such that said default data replaces any missing data fields in said retrieved data.

33. The database system of claim 32 wherein said default data is contained in the configuration data provided by said memory element.

34. A method for accessing a plurality of databases comprising the steps of:
- receiving a request for data from a user;
- accessing a default database for configuration data for said plurality of databases;
- deriving a database map from said requested data, said configuration data, and user information;
- accessing at least one database of said plurality of databases for said requested data based on said database map;
- receiving said requested data from said at least one database; and
- transmitting said requested data to said user.

35. The method of claim 34 further comprising the step of:
storing said database map in a cache memory.

36. The method of claim 34 further comprising the step of:
combining said data received from said at least one database with default data contained within said configuration data to generate said requested data.

37. The method of claim 34 wherein said user information is a DNIS of a call from said user.

38. The method of claim 34 wherein said user information is an OCN/Redirect of a call from said user.

39. The method of claim 34 wherein said user information is an address inputted by said user.

40. The method of claim 34 wherein said user information is the DNIS of a call from said user.

* * * * *